US010620297B2

(12) United States Patent
Cohen et al.

(10) Patent No.: US 10,620,297 B2
(45) Date of Patent: Apr. 14, 2020

(54) RADAR METHODS AND APPARATUS USING IN PHASED ARRAY COMMUNICATION SYSTEMS

(71) Applicant: Intel Corporation, Santa Clara, CA (US)

(72) Inventors: Alon Cohen, Petach Tikva (IL); Yossi Tsfati, Rishon Le Zion (IL); Igal Yehuda Kushnir, Hod-Hasharon (IL); Noam Kogan, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 15/389,426

(22) Filed: Dec. 22, 2016

(65) Prior Publication Data
US 2018/0180713 A1 Jun. 28, 2018

(51) Int. Cl.
G01S 7/00 (2006.01)
G01S 13/32 (2006.01)
(Continued)

(52) U.S. Cl.
CPC .............. G01S 7/006 (2013.01); G01S 13/32 (2013.01); G01S 13/42 (2013.01); G01S 13/583 (2013.01);
(Continued)

(58) Field of Classification Search
CPC .......... G01S 7/006; G01S 13/32; G01S 13/42; G01S 13/58; G01S 2013/0245;
(Continued)

(56) References Cited

U.S. PATENT DOCUMENTS 3,691,560 A * 9/1972 Hammack ............... G01S 1/302
342/387
2005/0041746 A1* 2/2005 Rosen ................... H04B 1/7163
375/242
(Continued)

FOREIGN PATENT DOCUMENTS

JP 2011127910 6/2011

OTHER PUBLICATIONS

Moldovan et al.; A new 94-GHz Six-Port Collision-Avoidance Radar Sensor; Mar. 2004; IEEE Transactions on Microwave Theory and Techniques, vol. 52, No. 3. (Year: 2004).*
(Continued)

Primary Examiner — Peter M Bythrow
(74) Attorney, Agent, or Firm — Kowert, Hood, Munyon, Rankin & Goetzel, P.C.

(57) ABSTRACT

Aspects of the present disclosure of may comprise an apparatus of a wireless device configurable for wireless communications and radar operations, the apparatus comprising memory. The apparatus may further comprise processing circuitry coupled to the memory, wherein when configured for the radar operations, the processing circuitry is configured to generate a plurality of scanning signals at different frequencies, configure a transceiver to transmit the scanning signals, configure the transceiver to detect radar return signals corresponding to the scanning signals, the radar return signals to be detected concurrently with transmission of the scanning signals, and configure a radar module to receive the scanning signals and the corresponding radar return signals and determine phase and gain differences between the scanning signals and the corresponding radar return signals.

28 Claims, 16 Drawing Sheets

(51) Int. Cl.
  *G01S 13/42* (2006.01)
  *G01S 13/58* (2006.01)
  *G01S 13/02* (2006.01)
(52) U.S. Cl.
  CPC ............... *G01S 2013/0263* (2013.01); *G01S 2013/0272* (2013.01)
(58) Field of Classification Search
  CPC ......... G01S 2013/254; G01S 2013/263; G01S 2013/272; H04W 84/18; H04W 99/00; H04W 92/00; H04W 92/02; H04W 92/04
  See application file for complete search history.

(56) References Cited

U.S. PATENT DOCUMENTS

| | | |
|---|---|---|
| 2007/0035437 A1 | 2/2007 | Steinway et al. |
| 2011/0001659 A1 | 1/2011 | Hampel et al. |
| 2011/0176709 A1 | 7/2011 | Park et al. |
| 2012/0092284 A1* | 4/2012 | Rofougaran ............ G06F 3/017 345/173 |
| 2013/0127652 A1 | 5/2013 | Bruce |
| 2014/0253365 A1* | 9/2014 | Kirsch .................... G01S 13/58 342/112 |
| 2017/0074974 A1* | 3/2017 | Rao ......................... G01S 7/352 |
| 2017/0102457 A1* | 4/2017 | Li ............................. G01S 7/35 |
| 2017/0131392 A1* | 5/2017 | Schoor .................... G01S 7/354 |
| 2017/0290011 A1* | 10/2017 | Kushnir .................. G01S 7/006 |
| 2018/0287651 A1* | 10/2018 | Fernando ............. H04B 7/0617 |

OTHER PUBLICATIONS

"International Application Serial No. PCT/US2017/056505, International Search Report dated Jan. 19, 2018", 3 pgs.
"International Application Serial No. PCT/US2017/056505, Written Opinion mailed International Application Serial No. PCT/US2017/056505, Written Opinion dated Jan. 19, 2018", 6 pgs.

* cited by examiner

RADAR METHODS AND APPARATUS USING IN PHASED ARRAY COMMUNICATION SYSTEMS

TECHNICAL FIELD

Aspects of the present disclosure pertain to wireless networks, wireless communications and radar. Some aspects of the present disclosure relate to wireless local area networks (WLANs) and Wi-Fi networks including networks operating in accordance with the IEEE 802.11 family of standards, such as the IEEE 802.11 ac, IEEE 802.11ad and IEEE 802.11ay standards, the IEEE 802.11 ax study group (SG) (named DensiFi) and WiGig. Other Aspects of the present disclosure pertain to mobile wireless communication devices such as the 4G and 5G cellular communication standards. The technical field more specifically pertains to radar implementations using communication systems with phase ambiguity solutions.

BACKGROUND

Wireless communications have been evolving toward ever increasing data rates (e.g., from IEEE 802.11a/g to IEEE 802.11n to IEEE 802.11ac IEEE 802.11ac, IEEE 802.11ad and IEEE 802.11ay). Currently, 5G, WiGig, 802.111ad and 802.11ay standards are being introduced for mobile wireless devices and Wireless Local Area Networks (WLAN) respectively. Given the sophistication of these devices which conform to these standards, new uses for these devices without significant modification would be advantageous

BRIEF DESCRIPTION OF THE DRAWINGS

The present disclosure is illustrated by way of example and not limitation in the figures of the accompanying drawings, in which like references indicate similar elements and in which.

DESCRIPTION

Aspects of the present disclosure relate to systems, devices, apparatus, assemblies, methods, and computer readable media to enhance wireless communications, and particularly to communication systems using phased array antennas. The following description and the drawings illustrate specific aspects of the present disclosure to enable those skilled in the art to practice them. Other aspects of the present disclosure can incorporate structural, logical, electrical, process, and other changes. Portions and features of some aspects of the present disclosure can be included in, or substituted for, those of other aspects of the present disclosure, and are intended to cover all available equivalents of the elements described.

Currently, 5G, WiGig, 802.11ad and 802.11ay standards are being introduced for mobile wireless devices and Wireless Local Area Networks (WLAN) respectively. Given the sophistication of these devices conforming to these standards, new uses for these devices would be advantageous. Communication devices that contain high frequency and beam forming mechanism, in a smartphone for example, have a majority of the hardware that are required to implement Radar on those devices.

Figure 1:
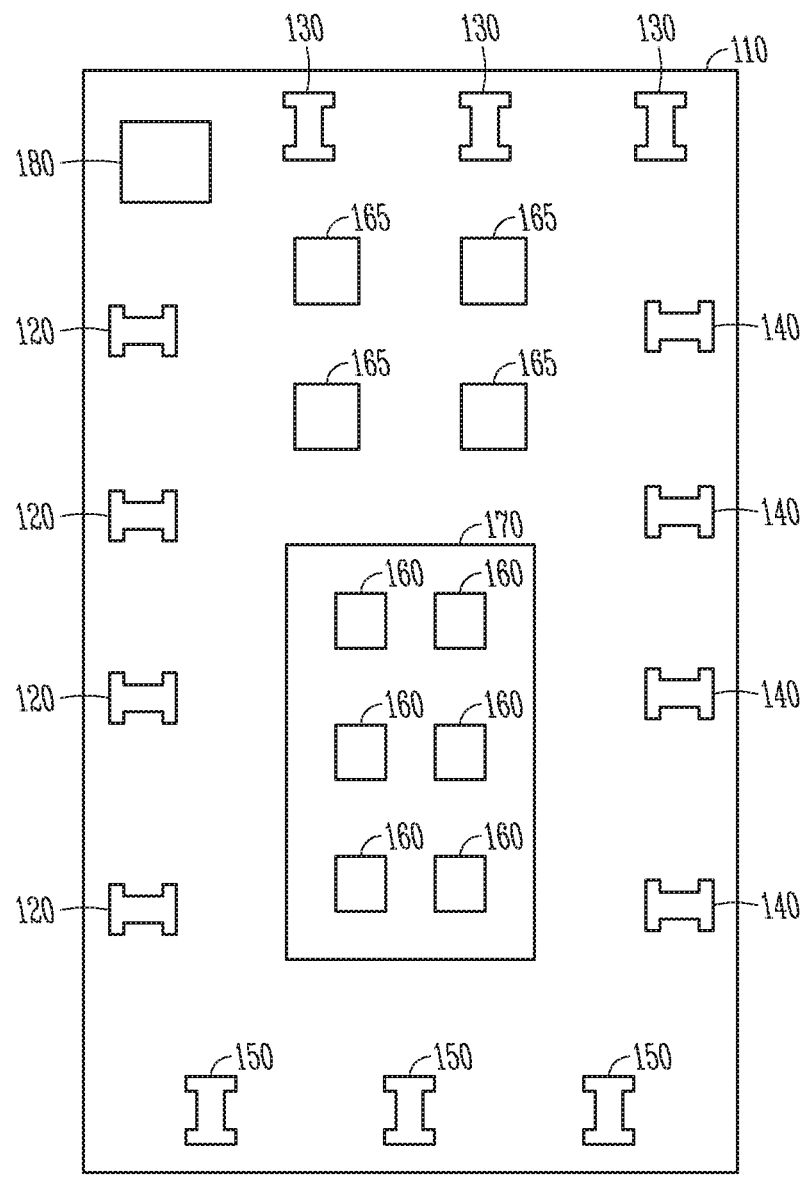
FIG. 1 illustrates exemplary implementations of a wireless mobile device comprising six phased array antenna modules for use with certain aspects of the present disclosure described herein.

FIG. 1 illustrates a wireless mobile device 110 comprising six phased array antenna modules for use with certain aspects of the present disclosure described herein. A four of the six phased array antenna modules are side mounted dipole antenna modules 120, 130, 140, and 150. The remainder of the six phased array antenna modules are patch antenna phased array antenna modules 160 and 165. Using the six antenna phased array modules, the device is capable of directed radiation in all 6 directions (Up, Down, North, South, East and West). Wireless mobile device 110 also includes a Radio Frequency Integrated Circuit (RFIC) 170 and a coaxial connector 180. These elements of FIG. 1 illustrate some aspects of the present disclosure of how the phased array antenna modules can be arranged around other elements in the mobile device and still retain the ability to radiate and receive in all six directions.

Figure 2:
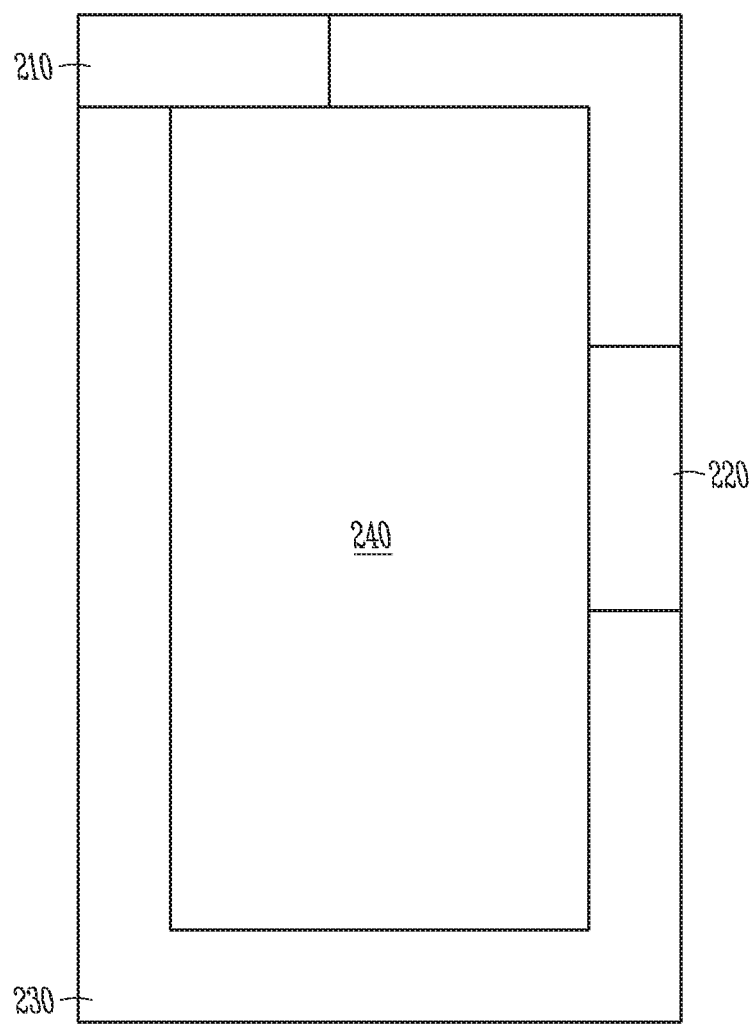
FIG. 2. Illustrates a mobile wireless device with two phased array antenna elements, each with a corresponding Remote Front End Module (RFEM) in accordance with some aspects of the present disclosure described herein.

FIG. 2. illustrates a mobile wireless device 230 with two phased array antenna elements, each with a corresponding Remote Front End Module (RFEM) 210 and 220 in accordance with some aspects of the present disclosure described herein. The screen is also shown as element 240. The plurality of phased array antenna modules may be implemented to enable the radar as provided herein.

A short range radar can emit low level radiation in a band that complies with FCC regulations (e.g. the ISM bands like 24 GHz or 61 GHz). As with any radar, a signal can be radiated from a transmit antenna and the echo of the reflected signal produced by a target can be sensed by a receiver. The nature of the echoed signal may provide information about the target including range, type of material etc. If the radar is implemented with a phased array system, it is capable of these measurements in multiple directions. With that information, the gain of the phased array antenna module can be electronically redirected.

The phased array radar can be implemented to cover some or all directions with inexpensive components and with a minimal physical foot print. Also, the phased array radar being described below in various aspects of the present disclosure uses similar devices as a wireless communication system. This allows for the practical incorporation and re-use of material, RF components, and antennas which will reduce the implementation cost.

Figure 3:
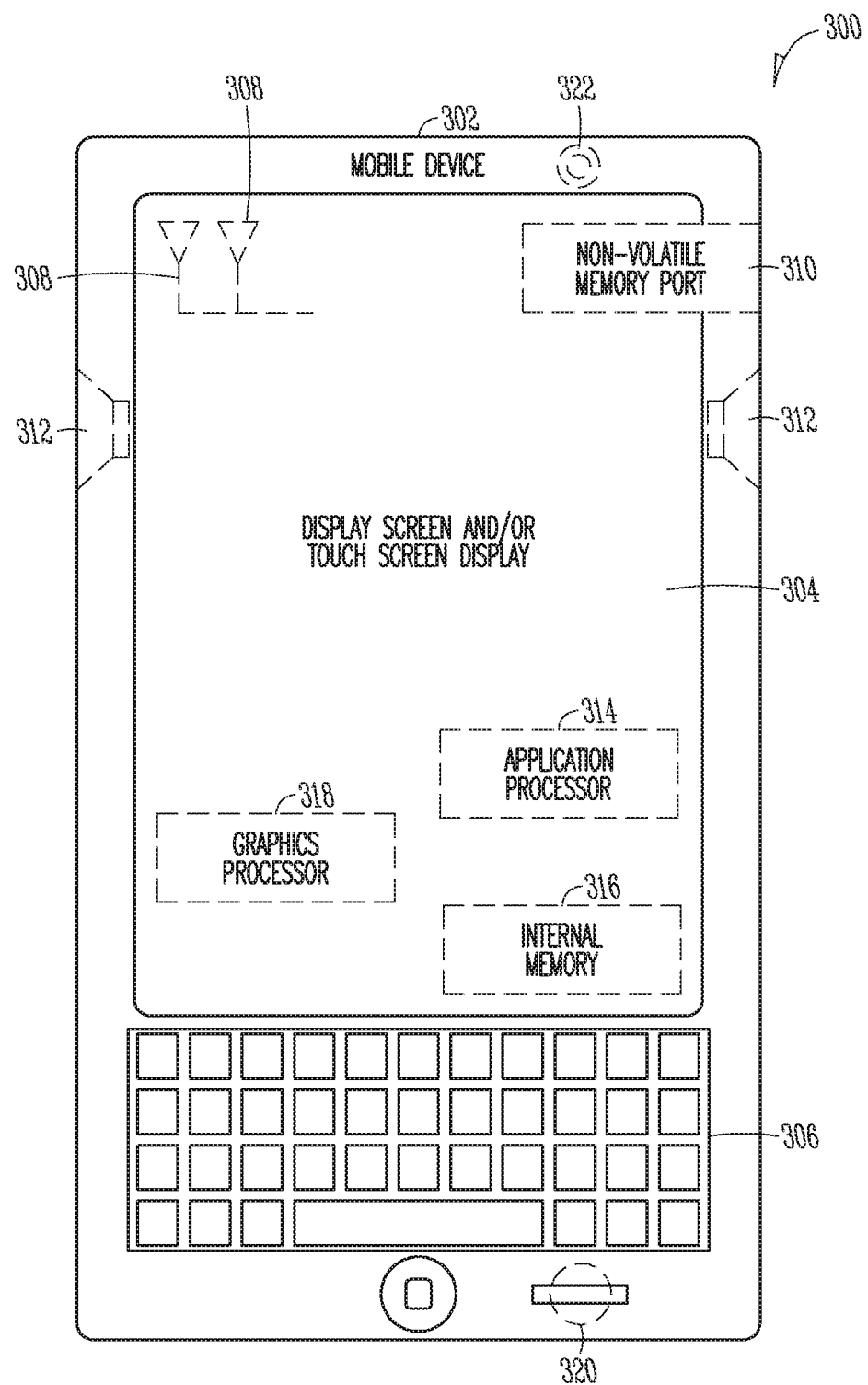
FIG. 3 illustrates a device that may be used for communications and for radar in accordance with some aspects of the present disclosure.

FIG. 3 illustrates an example of a device 300, which may be a phased array communication system including circuitry to transmit and receive signals and a radar in accordance with some aspects of the present disclosure. The device 300 can be any mobile device, a mobile station (MS), a mobile wireless device, a mobile communication device, a tablet, a handset, laptop, wireless access point or other type of wireless communication device. The device 300 can include one or more antennas 308 within housing 302 that are configured to communicate with a hotspot, base station (BS), an evolved node B (eNB) for cellular network access, or other type of WLAN or WWAN access point. The device may thus communicate with a WAN such as the Internet via a network, access point, or base station. The device 300 can be configured to communicate using multiple wireless communication standards, including standards selected from 3GPP LTE, WiMAX, High Speed Packet Access (HSPA), Bluetooth, and Wi-Fi standard definitions. The device 300 can communicate using separate antennas for each wireless communication standard or shared antennas for multiple wireless communication standards. The device 300 can communicate in a WLAN, a WPAN, and/or a WWAN.

FIG. 3 also shows a microphone 320 and one or more speakers 312 that can be used for audio input and output from the device 300. A display screen 304 can be a liquid crystal display (LCD) screen, or other type of display screen such as an organic light emitting diode (OLED) display. The display screen 304 can be configured as a touch screen. The touch screen can use capacitive, resistive, or another type of touch screen technology. An application processor 314 and a graphics processor 318 can be coupled to internal memory 316 to provide processing and display capabilities. A non-volatile memory port 310 can also be used to provide data input/output options to a user. The non-volatile memory port 310 can also be used to expand the memory capabilities of the device 300. A keyboard 306 can be integrated with the device 300 or wirelessly connected to the device 300 to provide additional user input. A virtual keyboard can also be provided using the touch screen. A camera 322 located on the front (display screen) side or the rear side of the device 300 can also be integrated into the housing 302 of the device 300.

Figure 4:
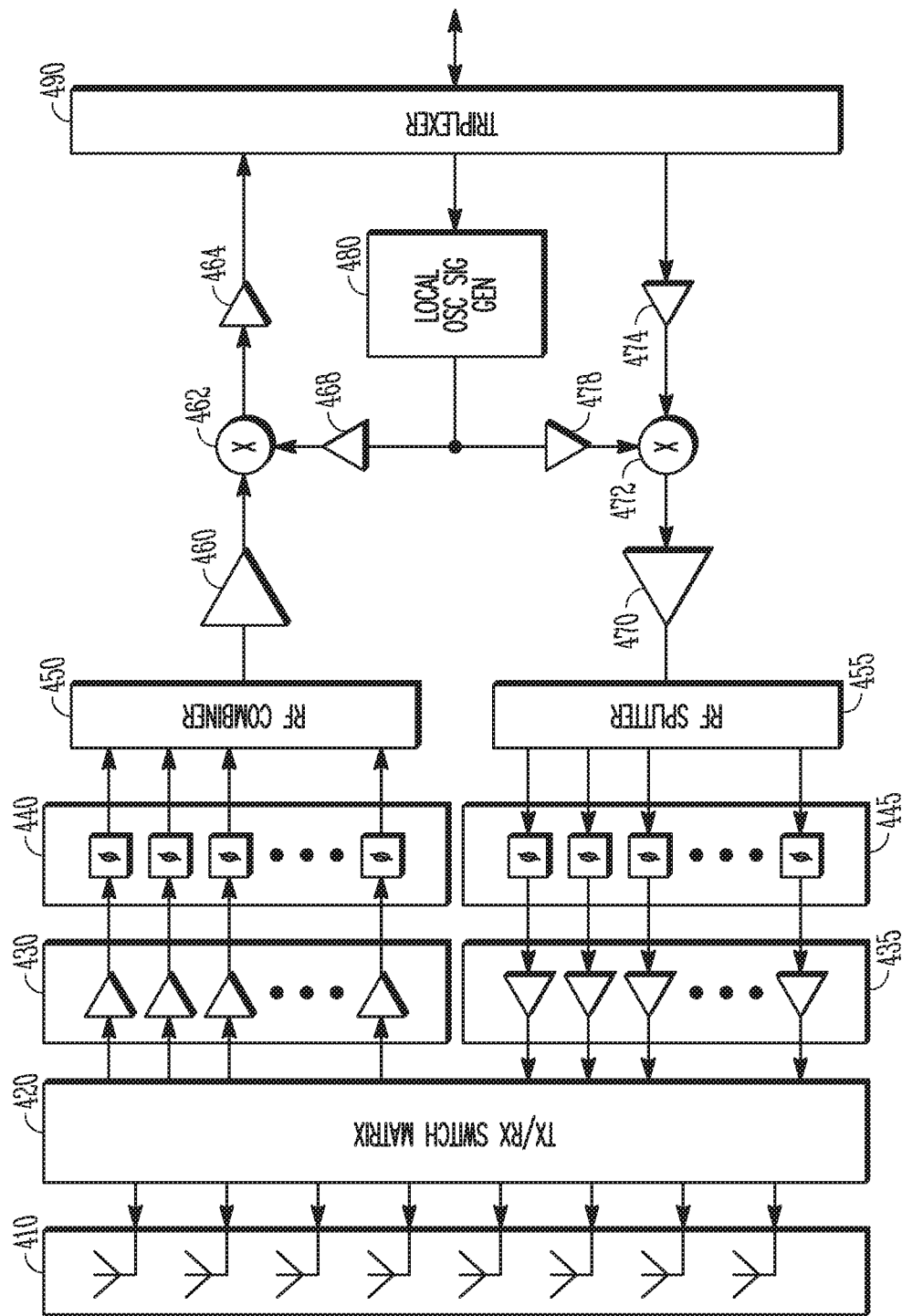
FIG. 4 shows a Radio Frequency (RF) phased array communication module including circuitry for up and down conversion to the Intermediate Frequency (IF) in accordance with some aspects of the present disclosure described herein.

FIG. 4 shows a Radio Frequency (RF) phased array communication module including circuitry for up and down conversion to the Intermediate Frequency (IF) in accordance with some aspects of the present disclosure described herein. The phased array antenna module 410 comprises a number of antenna elements, each of which can be connected through a switch matrix 420 to the transmit and receive chains. This way, each antenna element can be dynamically configured for transmitting or receiving. The switch matrix 420 is connected to a bank of Low Noise Amplifiers (LNA) 430 and a bank variable phase shifters 440. The outputs of the phase shifters are added together in the RF combiner 450. The output of the combiner is further amplified by the RF amplifier 460, down converted to the IF frequency by the down conversion mixer 462 and further amplified by the IF amplifier 464. Filtering stages that may be introduced anywhere through the receive chain are not shown. The down converted IF signal is passed through the triplexer to the baseband module shown in FIG. 5. The triplexer also feeds the IF transmit signal from the baseband module to the RFEM. The IF transmit signal is amplified through the IF amplifier 474, up converted through the up conversion mixer 472 and amplified again by the RF amplifier 470. Here the RF transmit signal is split into a plurality of transmit signal paths by the RF splitter 455. Each transmit signal path is adjusted by the phase shifters 445 and passed through RF power amplifiers 435. The RF transmit signals are then passed through the TX/RX switch matrix 420 to be radiated by elements in the phased array antenna module 410. As with the receive path, filtering may be introduced anywhere along the transmit chain and is not shown. Finally, the Local Oscillator (LO) signal is generated by the RF synthesizer 480 using a reference derived from the baseband module through the triplexer 490. The IF LO amplifiers 468 and 478 boost the LO signal to an appropriate level to drive the mixers. It is also possible to use dedicated antenna elements directly connected to the LNAs 430 and the Power amplifiers 435 and omit the switch matrix 420.

Figure 5:
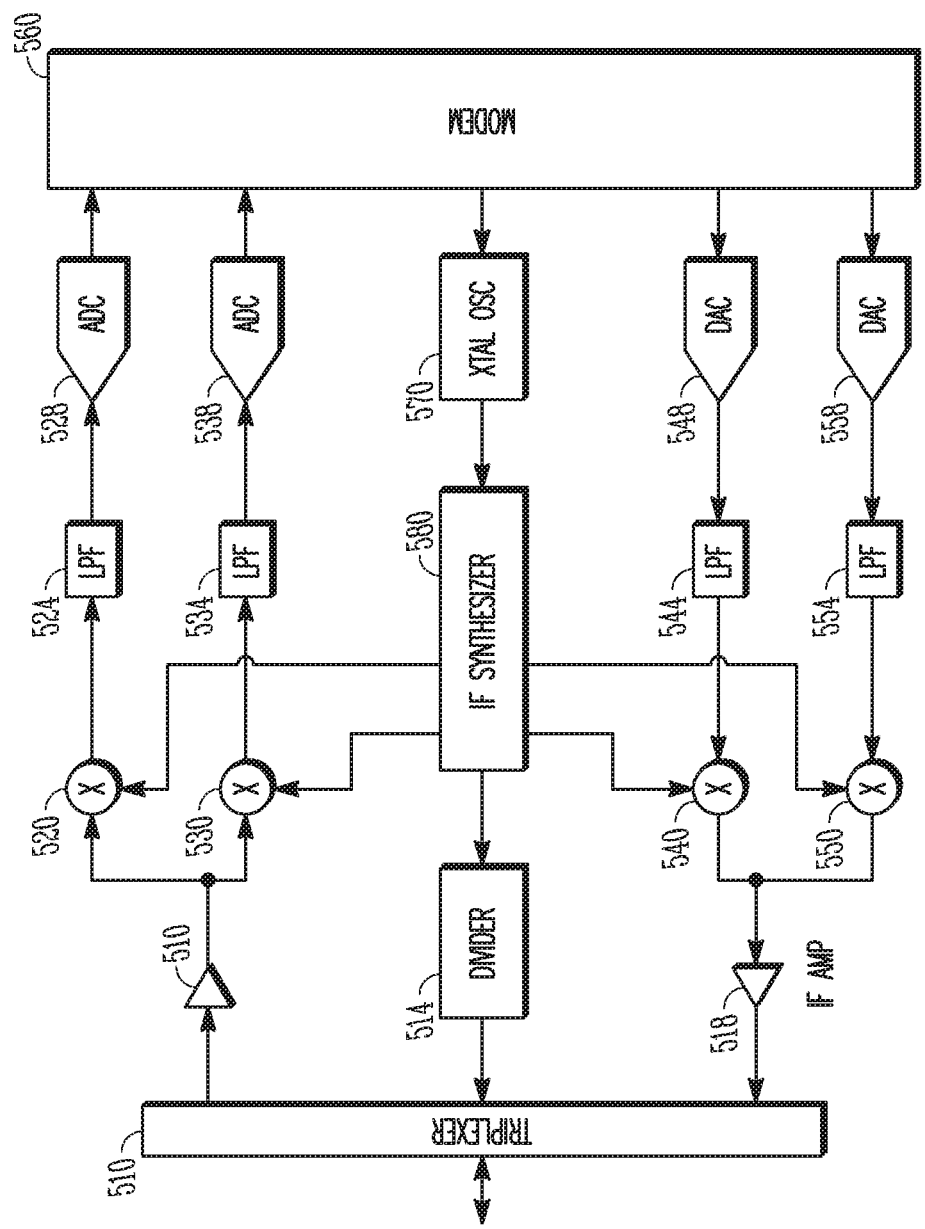
FIG. 5 shows a baseband receiver for the phased array communications in accordance with some aspects of the present disclosure described herein.

FIG. 5 shows the baseband receiver for the phased array communication system in accordance with some aspects of the present disclosure described herein. The triplexer 510 is used to pass a reference signal and a transmit signal to the RF module and also used to receive the receive signal from the RF module. The received signal is passed through another IF amplifier 510, through the down conversion mixers 520 and 530, filtered by the low pass filters 524 and 534 and converted through the Analog to Digital Converters (ADC) 528 and 538. The receive signal paths through 520 and 530 are for the in-phase and quadrature signal components respectively. These signals are passed to baseband modem 560 for detection. The baseband modem 560 also generates the baseband transmit signal which is converted to analog through the Digital to Analog Converters (DAC) 548 and 558, filtered by the low pass reconstruction filters 544 and 554, through the up conversion mixers 540 and 550. The In-Phase and Quadrature-Phase signal components from the up-conversion mixers 540 and 550 are added and amplified through the IF amplifier 518 and finally passed to the RF module through the triplexer 518. Finally, the local oscillator signals are generated from the crystal oscillator 570 and the IF synthesizer 580. The reference signal is generated from the IF synthesizer 580 through the frequency divider 515 and passed to the RF module through the triplexer 510. FIGS. 4 and 5 together show a representative phased array wireless communication system. This is not to exclude the multitude of variations that could be used such as a digital IF architecture or a direct conversion architecture. The functionality can be divided into various modules (here it is divided into a baseband module and an RF module) or it can be combined all together without using a triplexer to communicate between modules. The RF, IF and baseband devices can also be combined into multiple Integrated Circuits (ICs) in a number of different ways or can be all combined into a single RFIC.

Phased array communication Systems are becoming more and more prolific in wireless communications most notably in the IEEE 802.11ad, IEEE 802.11ay, WiGig and 5G standards for smartphones, tablets, laptops, WLAN access points and other wireless devices. A phased array communication system uses an array of antennas to steer the transmit signal in particular direction. The directional control is achieved by phase shifting the signal to each antenna so that in a certain direction, the transmitted signals add coherently or constructively. In other directions, the transmitted signals add destructively, and the radiated power in those directions is reduced or nulled. In this way, the radiated energy can be focused and directionally controlled towards the target, or towards the receiver.

In a similar way the received signals from each antenna are phase shifted such that they add constructively when received from one direction, and they add destructively when received from another direction. It is the combination of the phase shift incurred by the difference in path delay between antennas and the phase shift introduced by the phase shifters that determine whether a signal in a particular direction is constructively or destructively added. In this manner, the directionality of the antenna can be adjusted by changing the phase delay introduced by each phase shifter. The phased array antenna system is essentially a directional antenna in which the directivity of the antenna can be electronically altered or controlled. The control comes at a hardware cost of the additional antenna elements that comprise the phased array antenna module, the plurality of amplifiers (either LNAs or PAs), the plurality of variable phase shifters along with a power splitter on the transmit side and a power combiner to add the signals on the receive side. Further costs are to control the additional hardware. Never-the-less, the antenna elements are inexpensive and can be easily integrated into a wireless mobile device. And the additional circuit components can be incorporated into the Communication Radio Frequency Integrated Circuit (RFIC) making this a practical and beneficial method to implement a wireless communication system.

Figure 6:
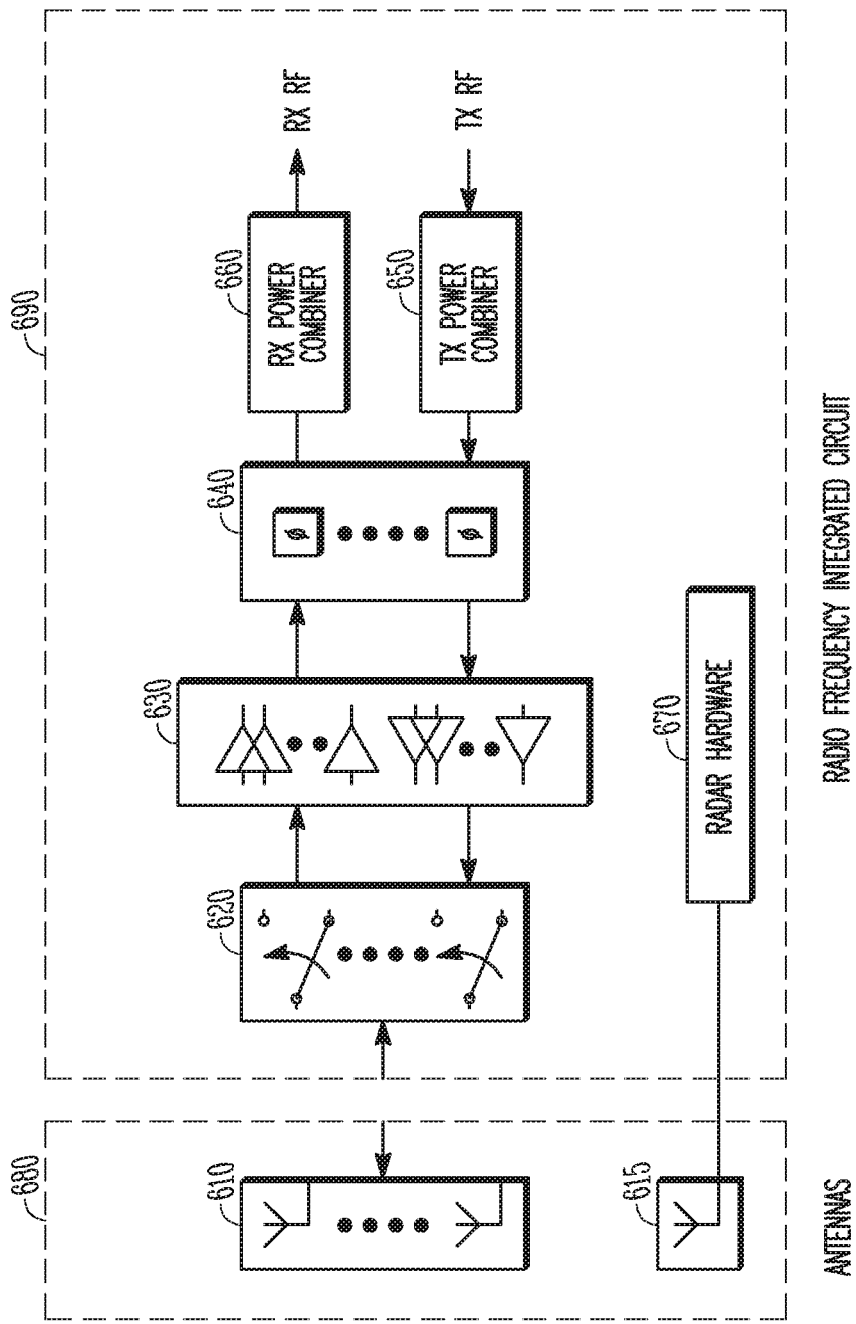
FIG. 6 illustrates a block diagram of a phased array Remote Front End Module (RFEM) implemented with radar circuitry for radar implementations using communication systems with phase ambiguity solutions in accordance with some aspects of the present disclosure.

FIG. 6 is a block diagram of a phased array Remote Front End Module (RFEM) implemented with a radar system. The phased array RFEM consists of a phased array antenna module 610, a bank of switches 620 to connect the phased array module elements 610 for transmitting or receiving. It further comprises a bank of LNAs and PAs 630, a bank of phase shifters 640 to control the directivity, a Transmit (TX) power splitter 650 to divide the transmit signal into a plurality of transmit paths and a receive (RX) power combiner 660 to add the received signals from the phased array antenna module 610. The system also includes a radar antenna 615 and radar hardware 670. The radar antenna element 615 is drawn together with the antenna phased array 610 in a combined antenna module 680 to indicate similarity in material, size and position within the wireless communication device. Specifically, the radar antenna 615 could be physically built as part of the phased array antenna module 610. The radar hardware 670 is also drawn to indicate the similarity in circuit components with the communication system RFEM. Specifically, part of the radar system could be integrated into the radio frequency integrated circuit (RFIC) 690. It is clear that the additional antenna and the additional hardware could be included with very little additional cost and with a very small physical footprint.

Figure 7:
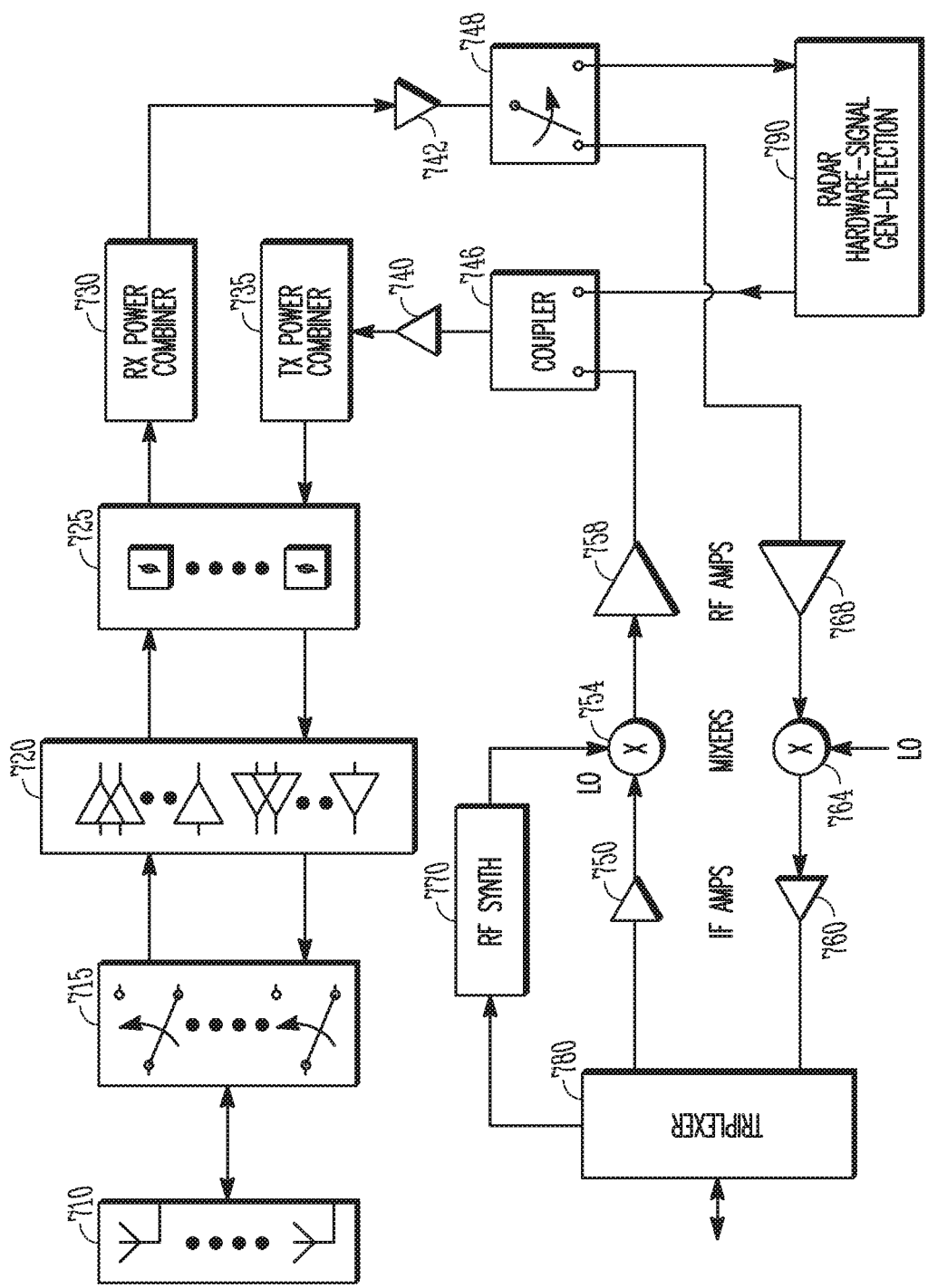
FIG. 7 is a block diagram of a phased array RFEM that is utilized for communications and for radar implementations using communication systems in accordance with some aspects of the present disclosure described herein.

FIG. 7 is a block diagram of a phased array RFEM that is utilized for communications and for radar in accordance with some aspects of the present disclosure described herein. In this aspect of the present disclosure, the radar system re-uses the communication phased array antenna module for the radar antenna. It also re-uses the RFEM of the phased array communication system. The phased array communication system is comprising a phased array antenna 710, a switch matrix 715 to connect different antenna elements for transmit or receive mode of operation, a bank of LNA's and PA's 720, a bank of phase shifters 725, an RX combiner 730, and a TX splitter 735. The operation of these elements is the same as that described in FIG. 4. However, the input of the TX power splitter 735 is connected to an RF switch 748 and coupler 746 through an RF amplifier 740. Similarly, the output of the RX power combiner 730 is connected to an RF switch 748 through an RF amplifier 742. The RF switch 748 can be set to allow the phased array antenna module and the RFEM to be used by either the communication system or the Radar system. The communication system operates as described earlier with FIG. 4. It is comprising IF amplifiers 750 and 760, Mixers 754 and 764, RF amplifiers 758 and 768, an RF synthesizer 770, a Triplexer 780 and a radar hardware module 790. Clearly, the re-use of the phased array antenna module and the RFEM to implement a radar system represents a considerable reduction in hardware.

Some aspects of the present disclosure may provide a continuous wave (CW) is transmitted and received simultaneously (also used herein as concurrently) using the six phased array antenna modules 120, 130, 140, 150, 160 and 165. Hence, a phase difference between transmitted signal and the received signal is measured but phase ambiguity is generated. Some aspects of the present disclosure solve the inherent phase ambiguity by using a discrete chirp method and solving the phase ambiguity by an equation using transmissions in many different frequencies (each for a short duration of time). Although not limited in this respect, as used herein, a chirp may mean transmitting a CW in a certain frequency for a short portion of time. This method also allows very narrow transmission and hence will have good receive sensitivity and link budget and hence will assure no interference with other communication systems. Typically for radar, a common practice uses a short time pulse followed by a match filter (or correlator) to measure round trip time (RTT). To realize this, common practice techniques uses either a transmit (Tx)/receive (Rx) switch or separate transmit and receive antennas.

The problem with a Tx/Rx switch is the switching time is not possible for a very short measurement distance. For example, to measure a 5 cm distance, there is a need for 0.3 nSec RTT (and switching time needed in the order of less than 0.3 nSec minus the message length—which is not feasible). A further problem is the need for ultra-high speed analog to digital converter (ADC) with a multi GigaHz sampling clock to yield accurate resolution. For example, in order to get 1 cm accuracy, there is a need for ~10 GHz sampling speed ADC (and run×3 interpolation).

For a transmitter and receiver with separate antennas and transmit/receive chains, the problem is compression which may cause severe issues when the transmit and receive antennas are located in close proximity. For example, if a system is using mmWave and the transmit and receive patch antennas are located in the same substrate, than assuming coupling of about 20 dB between elements will cause high compression. Also, a problem exists similar to the above, wherein there is a need for a high rate analog to digital conversion (ADC). Thus, existing technologies cannot measure effectively and in a low cost manner, the distance to an object that is located in close proximity and cannot provide high measurement accuracy without significant increase of the cost.

Although not limited to these systems, some aspects of the present disclosure may use an antenna array of a WiGig, IEEE 802.11ad or IEEE 802.11ay communication system as described above as a super accurate scanning radar. Dedicated hardware (HW) may be implemented inside a mmWave radio frequency integrated circuit (RFIC). This HW includes a chirp generator that is transmitted through the antenna. In parallel to this transmission, the receiver is active and the signal passes to a six-port and a set of power detectors (PDs) to estimate the phase of the received signal compared to the transmitted signal (leading to the RTT distance).

Figure 9:
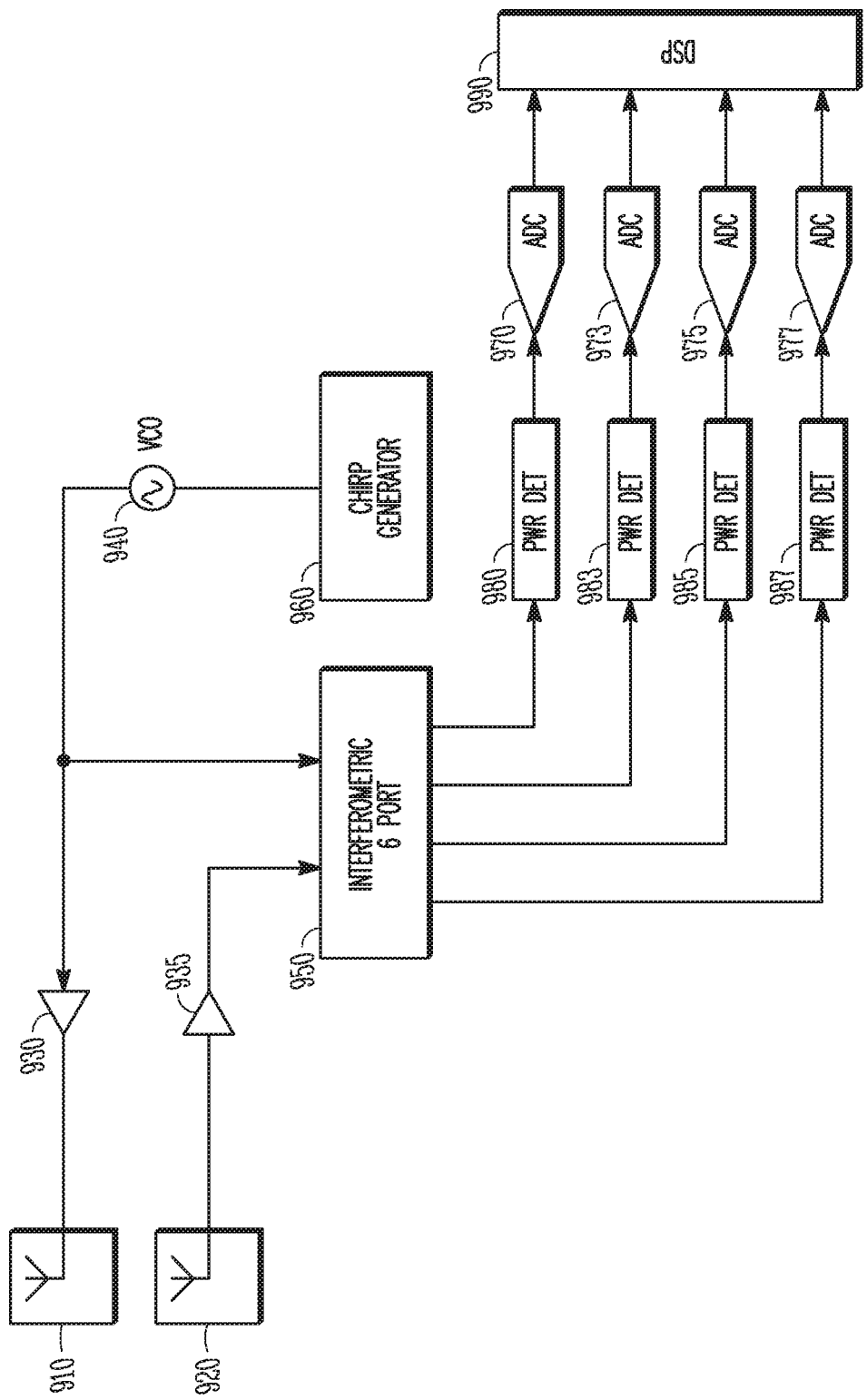
FIG. 9 shows another aspect of the present disclosure of a radar system similar to that of FIG. 8, but using a separate transmit antenna and receive antenna with no directional coupler in accordance with some aspects of the present disclosure.

FIG. 9 shows a basic radar system that can be configured for Continuous Wave (CW) radar in accordance with other aspects of the present disclosure. The basic operation of a radar is that a signal is radiated from an antenna. The signal radiates outwardly in space until it encounters an object. At that point, the radiated wave is scattered meaning some of the radiation enters or is transmitted through the object and some of the radiation is reflected by the object. The characteristics of the object such as the size of the object, the shape of the object and the type of material the object is made to determine how much radiated energy is absorbed or transmitted through the object and how much radiated energy is reflected by the object. The radiated energy that is reflected back towards the transmitter is called the back scatter. The reflected signal or scattered signal is received by the radar and processed. This processing involves the extraction of information from the reflected signal such as reflected power, range, Doppler and so on.

For CW radar, the transmitted signal is a constant frequency tone generated by the VCO 840 while holding the output of the chirp generator 860 constant. This is amplified by the RF power amplifier 830, and connected to the antenna 810 through the directional coupler 820. The transmitted carrier wave is reflected back by an object to the antenna module 810. The received reflected signal is passed through the directional coupler to the low noise amplifier (LNA) 835. The low noise amplifier output and the VCO output are connected to the passive interferometric six port device 850. This device adds the input signals from the VCO and from the LNA at four relative phase offsets and provides an output for each, 0, 90, 180 and 270 degrees. The VCO can be implemented as analog circuit or as digital implementation using NCO and DAC. Depending on the phase difference between the VCO output and the reflected signal, each output of the six port 850 will constructively or destructively add by varying amounts. The phase difference can then be determined by the power of each output from 850 using power detectors 880, 883, 885, and 887. The power is sensed by the ADCs 870, 873, 875 and 877 and processed in DSP 890. A range can then be determined from the phase difference between the transmitted signal and the reflected signal. The outputs can also provide a measure of the strength of the reflection which can help in determining the degree to which a blocking object is present. The accuracy of the range detection depends on the accuracy of the power detectors and the calibration and six port phase and gain imbalance. It is noted that all of these can be calibrated In the radar system described in FIG. 8, a directional coupler 820 is used to isolate the transmit and receive signals. This is necessary because the transmitter and the receiver operates simultaneously (also used herein as concurrently) and at the same frequency. Therefore, without sufficient isolation, the TX signal could bleed through to the receive path and be mistaken for a reflected signal. By using the directional coupler 820, the transmit and receive signals are separated or isolated by the direction of energy flow. The directional coupler could be implemented by a parallel line coupler, a 90 degree hybrid coupler, a circulator or any other device that provides directional isolation.

As described herein, a "return" signal refers to any reflection, scattering, near field coupling, or any other such signal that is identified from a transmit radiated signal of a device. A return signal thus refers to radiation from the device, and does not refer to a signal from another device.

Figure 8:
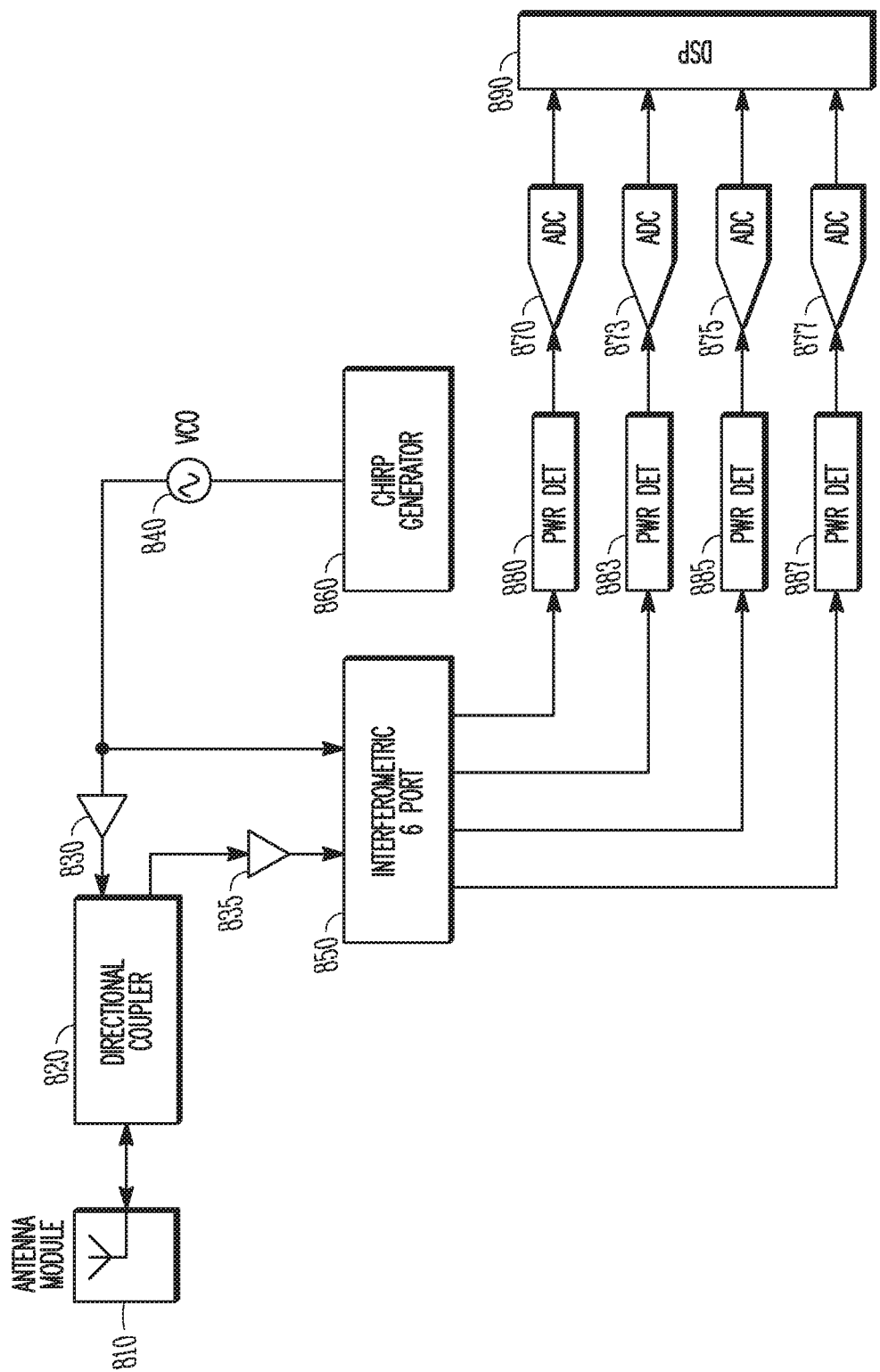
FIG. 8 shows a basic radar system that can be configured for Continuous Wave (CW) radar implementations using communication systems with phase ambiguity solutions in accordance with some aspects of the present disclosure.

FIG. 9 shows another aspect of the present disclosure of a radar system similar to that of FIG. 8, but using a separate transmit antenna 910 and receive antenna 920 with no directional coupler in accordance with some aspects of the present disclosure. However, in this aspect of the present disclosure, rather than using a directional coupler 820 to isolate the transmit and receive signals, a separate transmit antenna 910 and receive antenna 920 are used. If the antenna characteristics and arrangement or separation of the antennas are sufficient to provide enough isolation, this is a viable alternative. The hardware operates identically to that shown in FIG. 8. The radar hardware is comprising a power amplifier 930, an LNA 935, a Voltage Controlled Oscillator (VCO) 940, passive interferometric six port device 950, a chirp generator 960, power detectors 980, 983, 985 and 987, Analog to Digital Converters (ADC) 970, 973, 975 and 977 and a DSP module 990.

The types of radar described above and the hardware shown is not to limit the scope of the aspects of the present disclosure. Other types of radar and other methods of generating and detecting can also be implemented using the method and hardware re-use described herein. The aspects of the present disclosure described above can be modified in a variety of ways. For example, in one aspect of the present disclosure, the radar antenna module 615 may be connected to a directional coupler to simultaneously (also used herein as concurrently) support transmit and receive operation on the same antenna elements. Or the radar antenna module 615 may incorporate a transmit and a receive antenna. Here again, the radar antenna module 615 can be designed as part of the phased array communication antenna 610 providing minimal spatial separation. In another aspect of the present disclosure, the phased array communication antenna 710 could be slightly modified and re-used for radar operation. The transmit communication mode of the phased array antenna 710 could also be used to transmit the radar signal. The transmitted radar signal would be radiated from the same position and in the same direction as the transmit communication signal. Then additional antenna elements added to the phased array antenna module 710 could be used for receiving the reflected signal. In this way, the system could partially implement a phased array radar where the directivity of the transmit radar signal is electronically controlled. Or the opposite approach could be implemented where the additional antenna elements included in 710 could be used for transmitting the radar signal and the remaining antenna elements in 710 could be used as a phased array receive antenna as they are used in communication mode.

In further variations of the aspects of the present disclosure described above, the hardware and antenna modules could be added to operate the phased array communication system and the radar system simultaneously (also used herein as concurrently). Further still, it may be possible to perform the radar detection using the reflection of transmit communication signal. In yet another aspect of the present disclosure, the RF synthesizer 770 could be used to generate the CW transmit radar signal. The similarity between radar systems and communication systems and between phased array radar systems and phased array communication systems offer the opportunity to combine and re-use elements of each system in many different ways.

As set forth above, some aspects of the present disclosure may use the WiGig, IEEE 802.11ad, IEEE 802.11ay or mmWave communication system as a very accurate and long range scanning radar. Some aspects of the present disclosure may use a CW and transmit and receive simultaneously (i.e., no Tx/Rx switch) and measure the phase and gain between transmission and reception using elements such as a passive interferometric six port device (6-port) 850 or by measuring the phase and gain between transmission and reception. For example, by using direct conversion or any other receiver that can get the transmit signal as an local oscillator (LO) for the receiver Some aspects of the present disclosure may use the circuit of FIG. 8 and use radar embedded in a phase array. However, when using a CW, a phase ambiguity exists. Measured phase is proportional to the true distance plus the N time the Wavelength (where N is the number of times the wavelength of the signal that can fit from the transmitter to the obstacle).

Some aspects of the present disclosure may solve the phase ambiguity using a discrete chirp method which transmits a CW in multiple frequencies, each of the frequencies for a short period of time as described below. Subsequently, an equation can used to calculate the distance. Some aspects of the present disclosure may enable very narrow transmissions and hence will have extreme sensitivity and link budget and hence will assure no interference to other communication system. In addition, some aspects of the present disclosure provide that before transmission of any discrete signal, a carrier sense could be applied to verify that this transmission is not overriding other transmissions in the band.

Figure 10:
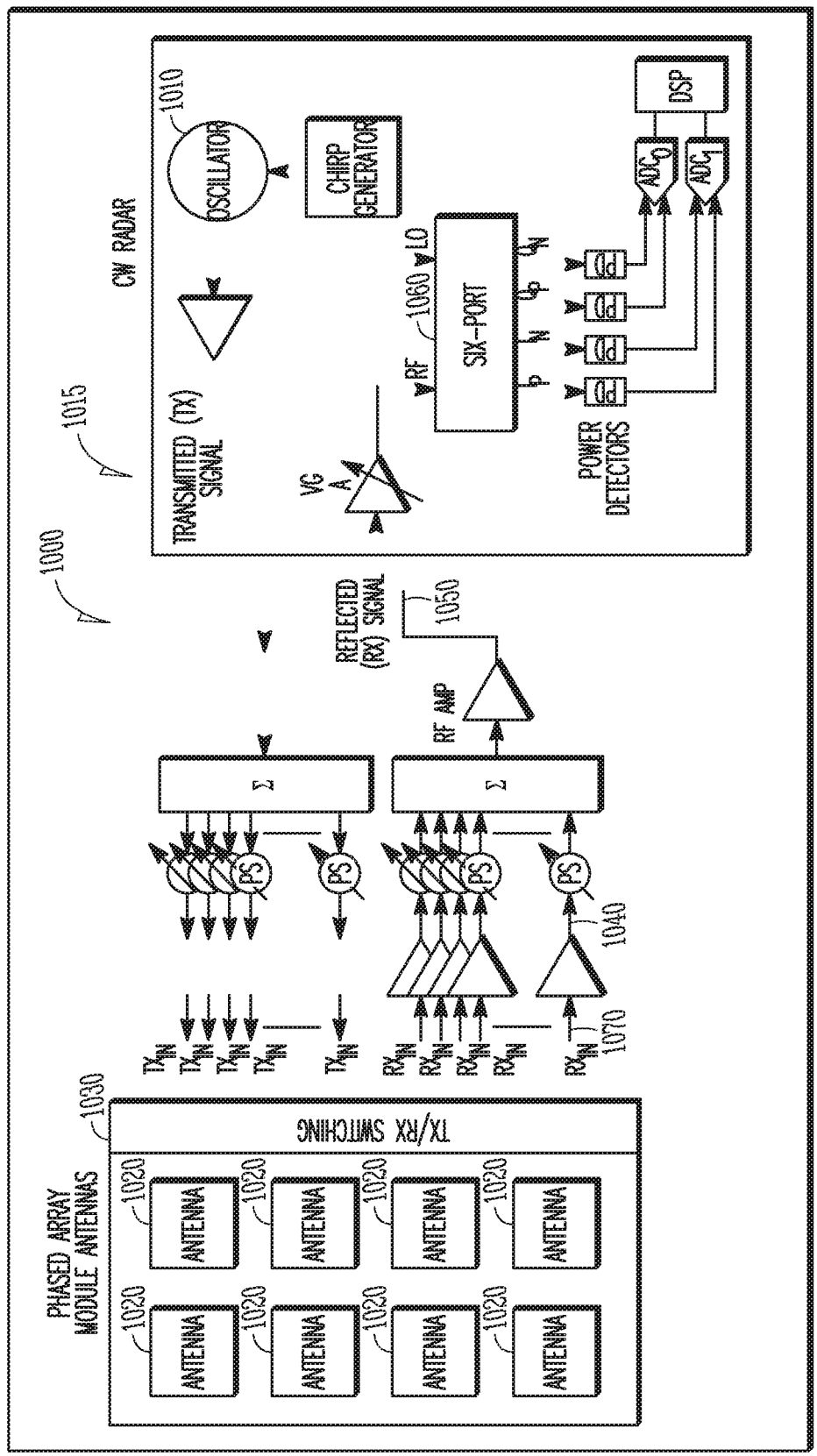
FIG. 10 illustrates hardware embedded inside a mmWave antenna array (RFEM) to create a sector swiping radar for radar implementations using communication systems with phase ambiguity solutions in accordance with some aspects of the present disclosure.

FIG. 10 illustrates hardware embedded inside a mmWave antenna array (RFEM) to create a sector sweeping radar for radar implementations using communication systems with phase ambiguity solutions in accordance with some aspects of the present disclosure. In the transmitter 1015, the oscillator 1010 feeds all the elements 1020 installed in the antenna 1030 to create a beam. The beam may be generated in any desired angle (using phase shifters). In the receiver 1040, similarly the receive portion 1050 feeding the six-port 1060 can also come from the antenna array receiver part 1070. Although aspects of the present disclosure are not limited in this respect, the hardware may use the CW generated in one of the following ways: A phase lock loop (PLL) that may already be implemented in an RFIC (if the entire 60 GHz/mmWave architecture requires PLL in the RFIC); using an L.O. signal sent over the cable (if the system uses a sliding IF architecture); or another independent/additional CW generation circuit is placed inside the radio frequency integrated circuit (RFIC).

Some aspects of the present disclosure may use a CW and transmit and receive concurrently or simultaneously (no Tx/Rx switch) and measure the phase between transmitting signal and receiving signal using elements, such as a 6-port 1060, or by measuring the phase and gain between transmission and reception. For example, by using direct conversion or any other receiver that can get the transmit signal as an local oscillator (LO) for the receiver.

However, when using a CW, a phase ambiguity exists. Measured phase is proportional to the true distance plus the N time the Wavelength (where N is the number of times the wavelength of this signal can fit from the Tx to the obstacle).

As mentioned above, to solve phase ambiguity some aspects of the present disclosure may use a discrete chirp method. Transmit a CW in a certain frequency at a short portion of time. Simultaneous to the above transmission, receive the signal with the six-port 850 and measure the relative phase. Once the above measurement is completed, move to a new frequency and receive it with six-port 850 and again measure the phase ambiguity. Continue and run this across N frequency and get N measurements of phases.

Figure 11:
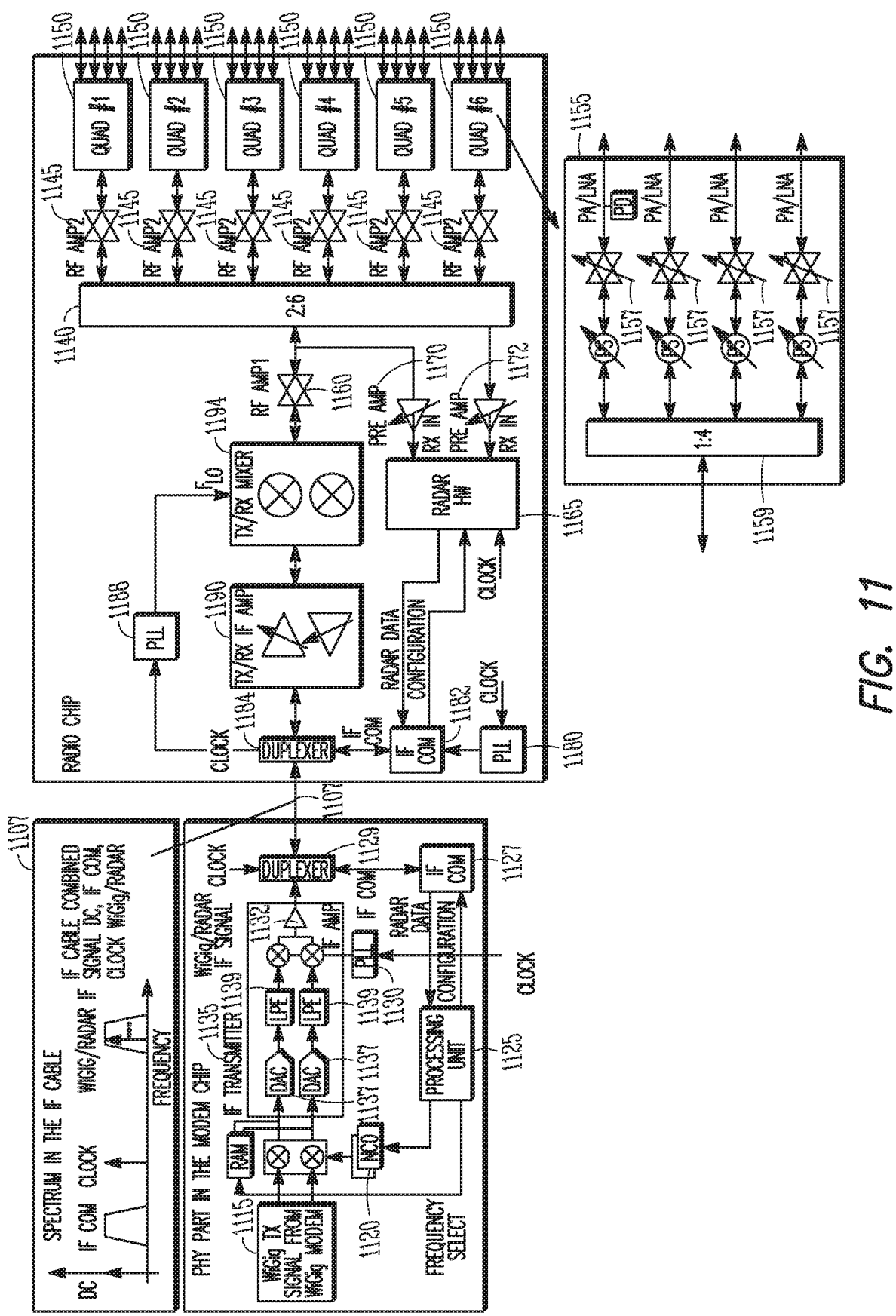
FIG. 11 is a block diagram of the mounting of a Radar block in a wireless communication system in accordance with some aspects of the present disclosure.

FIG. 11 illustrates a block diagram one mounting of a Radar block 1165 in a wireless communication system, such as, but not limited to, a WiGig and 5G system, enabling maximum reuse of an associated communication system according to an aspect of the present disclosure.

In an aspect of the present disclosure, Digital+Analog Block 1105 (which may also be referred to herein as an M-Chip) illustrates parts that may be reused between a WiGig system and the Radar system. A WiGig communication system may use all of the parts of M-Chip 1105, which may be the physical layer part of a modem chip and the Transmitter (digital and analog) of the WiGig communication system and also may be used for Radar operation.

In radar operation, an aspect of the present disclosure may generate the signal from the NCO 1120 or from the RAM 1117. The NCO 1120 and RAM 1117 is also used in the WiGig system. Reuse may include the M-Chip 1105 as well as in the Radio Chip (R-Chip) 1110. The transmitted signal is transmitted via duplexer 1129 to the IF cable 1107 and to the duplexer 1184 on the R-Chip 1110, then it is amplified by 1190 and converted with Mixer 1194 and the LO signal that generated in PLL 1188 to millimeter wave, then transmitted by antennas chains 1150 via 2:6 1140 block and RF APS 1145. The signal reflected from a target is received by the phased array antenna 1155 and passes to Radar HW 1165 via Pre AMP 1172 together with the reference signal that came from Pre AMP 1170, that it is actually the signal transmitted from which the return signal was based.

Figure 12:
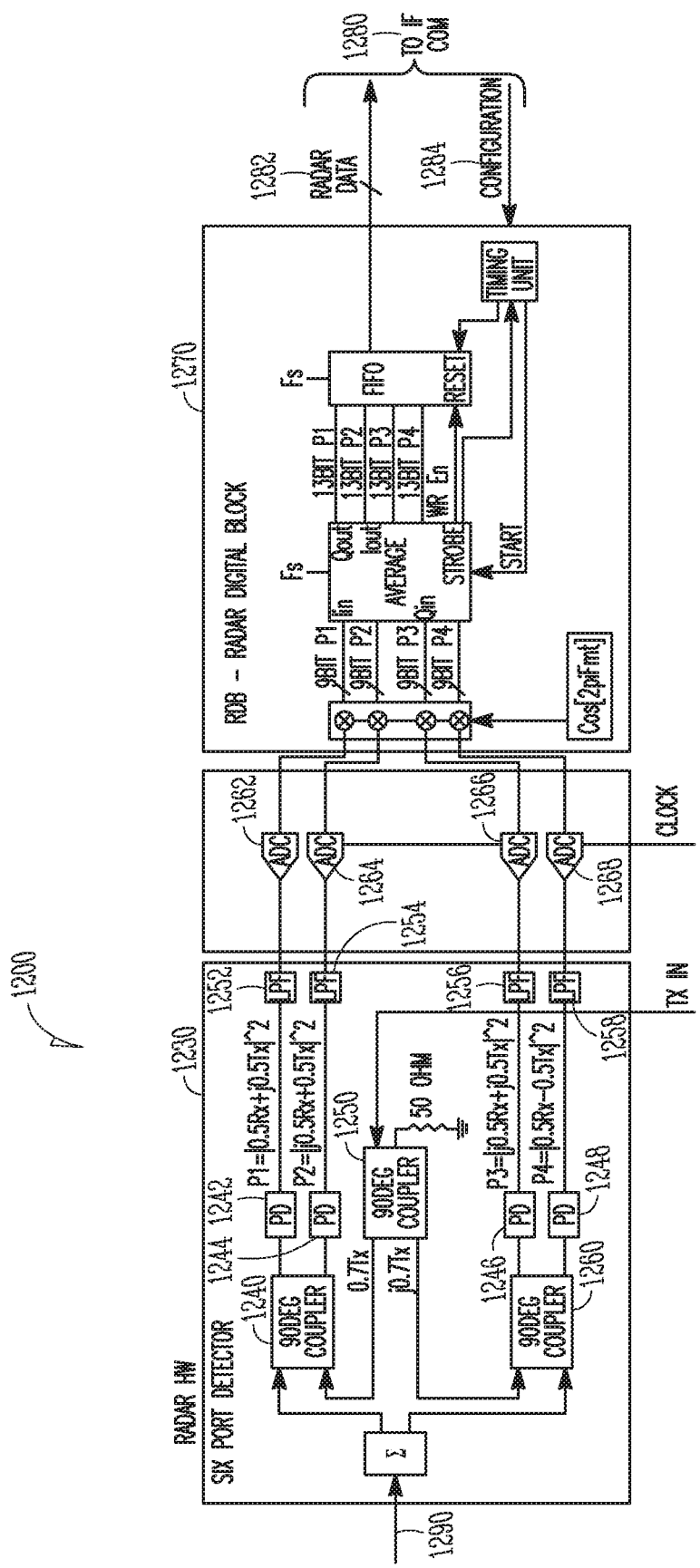
FIG. 12 depicts an implementation of hardware that may be used to capture samples as a preparation for the inverse Fast Fourier transfer (IFFT) in some implementations of the various aspects of the present disclosure.

The Radar HW 1165 extracts the phase and gain difference between the transmitted and returned signal and stores it in FIFO (set forth in greater detail with reference to FIG. 12). The information then passes from Radar HW 1165 through the IF Com 1182, which also receives input from PLL 1180, that is the communication IF block, to the IF Com 1127 via Duplexer 1129, that is the communication block in the M-Chip 1105 and from this block passed to processing unit which can be, although aspects of the present disclosure are not limited to, CPU/DSP 1125; the CPU/DSP using the phase and gain vs. frequency that measured and implement IFFT on those samples. The output of the IFFT result is the distances of objects located in the direction that the beam forming is focusing on.

Figure 13:
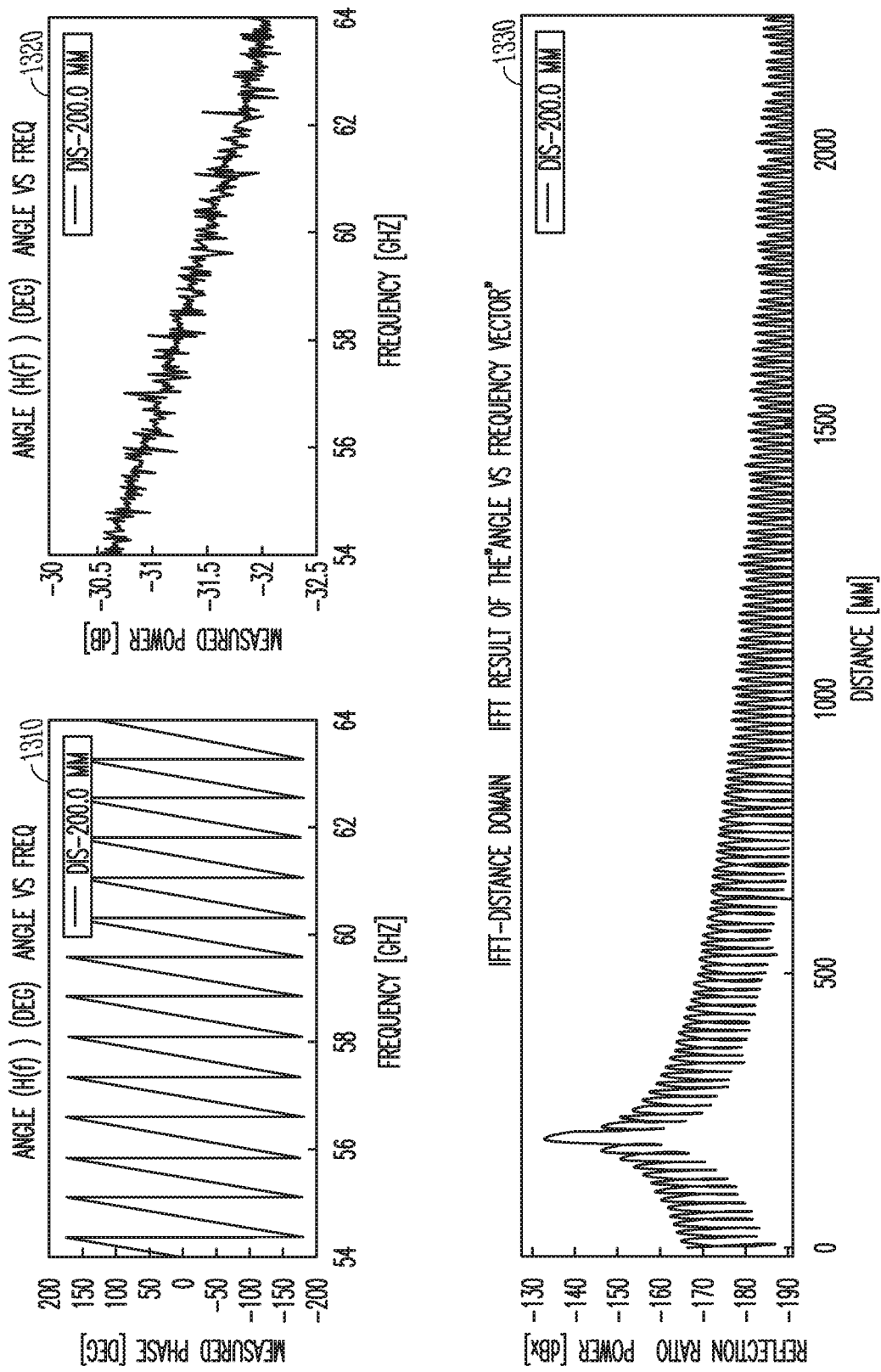
FIG. 13 graphically illustrates radar results of 200 mm Distance Objects in accordance with some aspects of the present disclosure.

The IFFT also provides information about multiple objects that are located in the same direction allows distinguishing between them as described in FIG. 13. From Gain and phase information it is possible to extract distance, velocity, vibration, dielectric constant of different materials. Tuning the beam forming to different direction provides 3D information for all of the parameters of velocity, vibration, dielectric constant of different materials Although not limited in this respect, in an aspect of the present disclosure, the great extent of parts reuse between a communication system (such as a WiGIG system and the radar system set forth herein may include: NCO 1120—used for frequency conversion in the WiGig and as signal generator (Discrete chirp generator in the Radar; Analog direct converter including DACs 1135—use as up converter for the WiGig and for the Radar signal; Duplexer 1129 and 1184 used to combine communication signal, clock signal and WiGig/Radar signal; Tx/Rx amp 1190—used to amplify the WiGig/Radar Tx signal; Mixer 1194—use to up-convert the signal of the Radar/WiGig from IF frequency to millimeter wave frequency; 2:6 matrix 1140 which allows the selection of any antenna combination for Tx/Rx in WiGig/Radar; Phased array—parts 1145, 1150 fully reused and allow beam forming in WiGig/Radar; High Speed IP Com 1182 and High Speed IF Com 1127 which may be used to implement the communication between the two chips M-Chip 1105 and R-Chip 1110 (this communication may be used in WiGig communications to configure the R-Chip and in Radar operation it may be used to transfer the gain and phase information from the R-Chip to the M-Chip; PLL 1188.

Aspects of the present disclosure may generate a plurality or one or more transmit signals of the Radar in Digital Block 1105 from components that may also be used for communications; including a modem which may enable the reuse of digital to analog converters (DACs) 1137, Low Pass Filters (LPFs) 839, PLL 830 and IF AMP 1132 in IF receiver 1135 and a baseband block including High Speed IF com 1127, DSP/MCU 1125, Wave Generator 1115 and Duplexer 1129. In an aspect of the present disclosure, all of a transmit path may also be used; which may include synthesizer, PLL 1180, IF Com 1182, Duplexer 1184, Phase Lock Loop (PLL) 1188, TX/RX Mixer 1194, TX/RX Amplifier 1190.

The transmit signal may be generated by NCO 1120 in a digital domain and then converted to analog signals via DAC 1137. The two ports of the radar block 1165 will be inputs (Rx in 1172 and Tx in 1170) and the block will do a phase and gain measure difference. Digital block 1105 may generate a discrete chirp signal/CW sweeping using numerically controlled oscillator (NCO) 1120 and converted to analog signal by DACs 1137 of IF receiver 1135 or it can be generated by holding the samples in RAM 1117 and send sample by sample to the DACs 1137. The benefits of RAM 1117 is the ability to generate any type of signal and an NCO is very efficient option and can generate a long period signal.

The 2:6 block 1140 of radar portion 1110 of FIG. 11 allows the connection of antenna group 1150 to the transmit chain (to RF AMP1 1160) and any antenna to the receive port of the Radar block 1165 via Pre AMPs 1170, so you can transmit and receive from any antenna. In the Radar block 1165, gain and phase may be measured and an IFFT may be implemented on the gain and phase samples (IFFT applied to the complex numbers). After measuring the phase and gain difference in Radar block 1165, the information is transferred to the DSP 1125 (that may also be used by the WiGig system) to High Speed IF comm 1127 via the IF communication link 1107 that used in the WiGig between the Modem 1105 to the Radio 1110. Further, an aspect of the present disclosure provides high sensitivity because of the scanning method of narrow signal FIG. 12 at 1200 illustrates a block diagram of the implementation of the Radar Block 1165 of an aspect of the present disclosure and may be used to capture samples as a preparation for the inverse Fast Fourier transfer (IFFT) in some implementations of the various aspects of the present disclosure. The IFFT is implemented in the DSP/CPU 1125 and thereafter the phase and gain information for every frequency is collected in the FIFO block of Radar Digital Block (RDB) 1270. In general, the Six port block 1230 gets the returned signal and transmitted signal inputs at 1290 and generates four baseband signals that pass into four power detectors. Those 4 signals contain the information about the phase difference and amplitude difference between the transmitted signal and the returned signal.

The output of the power detectors go to 4 ADCs (although 2 ADCs can be used and aspects of the present disclosure are not limited by the number of ADCs and ADCs of aspects of the present disclosure can be used with reuse). Then the four digital signals pass from the ADCs to average block that improve the dynamic range of the signal. The information is collected in the FIFO and transmitted to the CPU/DSP 1125 via High Speed IF communication block 1127 and RTC 1182. This may include an IF cable in an aspect of the present disclosure.

Signals transmitted from transmitter 1210 may be reflected from an object and is fed to six port detector 1230. Once received by Six port detector 1230, received signals are sent to 90 degree (and also may be referred to as hybrid) couplers 1240 and 1260. Signals that were transmitted were also sent to 90 degree coupler 1250 with 0.7Tx to 90 degree coupler 1240 and j0.7Tx to 90 degree coupler 1260. The output of 90 degree coupler 1240 is sent to Power Detector (PD) 1242 then to low pass filter (LPF) 1252 and PD 1244 and LPF 1254. The output of 90 degree coupler 1260 is sent to Power Detector (PD) 1246 then to low pass filter (LPF) 1256 and PD 1248 and LPF 1258.

Six Port Detector 1230 then outputs the signal from LPF 1252 to ADC 1262, LPF 1254 to ADC 1264, LPF 1256 to ADC 1266 and LPF 1258 to ADC 1268. The output of ADC 1262, ADC 1264, ADC 1266 and ADC 1268 are sent to Radar Digital Block (RDB) 1270 for calculations used in aspects of the present invention and output to IF Com at 1280. Radar Data input is shown at 1282 and configuration at 1284. Thus, the four signals output of ADC 1262, ADC 1264, ADC 1266 and ADC 1268 are composed from the summation of the received and transmitted signals with four shifting of 90, 180, 270 degree between them, thereby making possible, after correcting the four measured values in calibration data, the extraction of the exact phase and gain difference between them.

FIG. 13 at 1300 graphically illustrates radar results of 200 mm Distance Objects which shows the outcome is a vector of Measured Phases vs the Frequency Domain. The vector resembles a repetitive tooth edge where its time period is linearly proportional to the distance. Measured Phase vs Frequency is shown at 1310 and Measured Power vs Frequency is illustrated at 1320. The graph at 1330 illustrates an IFFT result of the Angle and Amplitude vs Frequency vector in the distance domain as a Reflection Ratio Power vs Distance.

Figure 14:
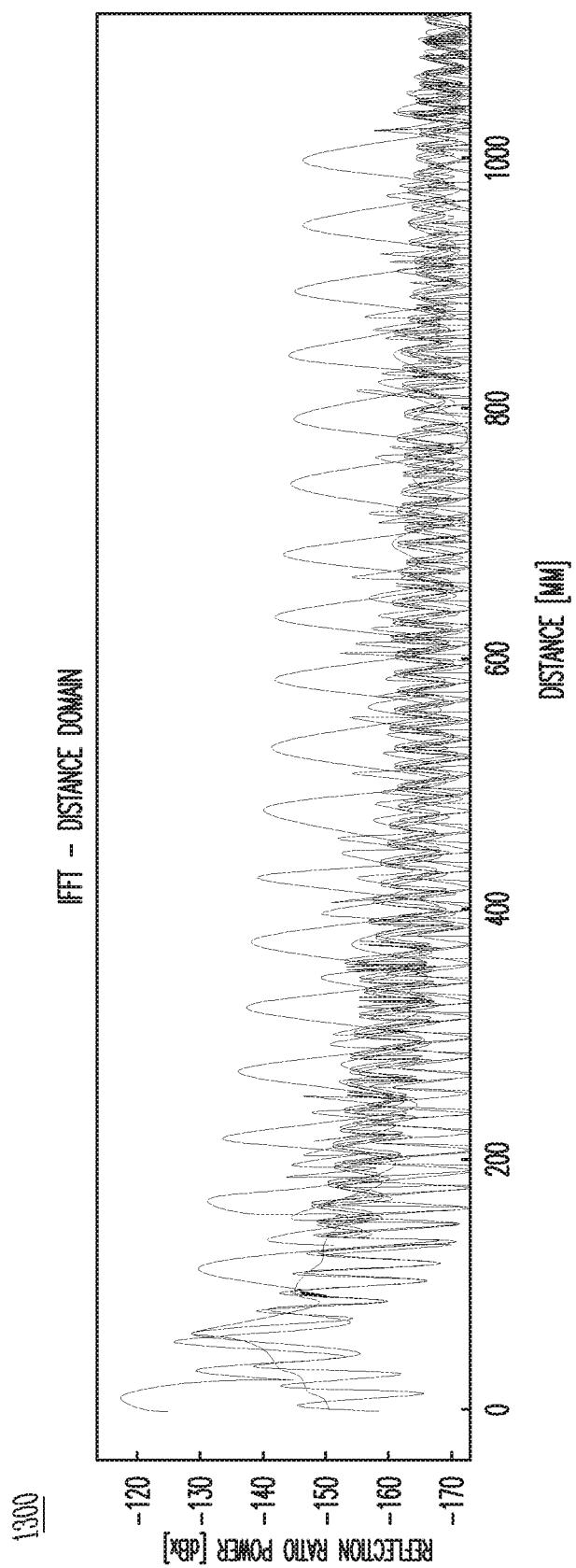
FIG. 14 graphically illustrates the results of an IFFT estimator for various locations of obstacle distance in accordance with some aspects of the present disclosure.

FIG. 14 at 1400 graphically illustrates the results of an IFFT estimator for various locations of obstacle distance. In addition to the IFFT estimator, other methods of extracting distance/velocity of the object from the phase and amplitude measurement between the transmissions and receptions may be used. For example, but not limited to, correlation, match filter, music algorithm or any algorithm that enables finding correlation in superposition of reflected signals in with good accuracy.

Below mathematically illustrates that for each specific distance, the time period of the phase-vs-frequency of a "discrete chirp" is linearly proportional to the distance. Assume that we have M static reflectors, each one of them in distance $L_i$ for $$i=1:M$$

As described in the above text, the transfer function of the medium will be measured at the output of the Six Port Detector For our case, every reflector provide specific amplitude and phase between the Tx to Rx.

Let's define the gain and phase of each reflector as:

$$S_i = A_i * e^{j\theta_i}$$

For transmission of a specific carrier frequency in frequency f we will measure the summation of all of the reflectors without the ability to distinguish between each one of them:

$$S_{Total} = \sum_{i=1}^{M} A_i \cdot e^{j\theta_i}$$

$$\lambda = \frac{v}{f}; \theta_i = \frac{2 \cdot L_i}{v/f} \cdot 2\Pi = \frac{2\Pi f}{v} \cdot 2L_i = 2\frac{\omega L_i}{v}$$

$$\theta_i = 2\frac{\omega L_i}{v}$$

$$S_{Total} = \sum_{i=1}^{M} A_i \cdot e^{j2\frac{\omega L_i}{v}}$$

M – Number of reflectors i – Specific reflector

Li – distance of the reflection $v$ – Propagation speed $f$ – Frequency

For discrete scanning from $f_1$ to $f_2$ with $\Delta f$ resolution, we getting:

$$\omega = 2\Pi f \rightarrow \frac{d\omega}{df} = 2\Pi \rightarrow \Delta\omega = 2\Pi \cdot \Delta f$$

Let's define $\tilde{k}$ as the frequency index such that $\omega = \tilde{k} \cdot \Delta\omega$ Sampling $S_{Total}$ provide:

$$S_{Total}[\tilde{k}] = \left[ rect\left(\frac{\tilde{k}\Delta\omega}{BW}\right) * \delta(\tilde{k}\Delta\omega - \omega_0) \right] \cdot \sum_{i=1}^{M} A_i \cdot e^{j2\frac{\Delta\omega L_i}{v} \cdot \tilde{k}}$$

$$\omega_0 \equiv \frac{w_2 + w_1}{2}; BW \equiv w_2 - w_1; 0 < \tilde{k} < \infty$$

We like to perform IFFT on the interesting information, i.e. from w1 to w2, for that, we like to switch to another index that will start from 1 on this range, let's define $$\tilde{k} = \left(k + \frac{w_1}{\Delta\omega}\right)$$

-continued $$S_{Total}[k] =$$

$$\left[ rect\left(\frac{\left(k + \frac{w_1}{\Delta\omega}\right)\Delta\omega}{BW}\right) * \delta\left(\left(k + \frac{w_1}{\Delta\omega}\right)\Delta\omega - \omega_0\right) \right] \cdot \sum_{i=1}^{M} A_i \cdot e^{j2\frac{\Delta\omega L_i}{v} \cdot \left(k + \frac{w_1}{\Delta\omega}\right)}$$

$k = 1:N, N$ – number of samples $rect(\ )*\delta(\ )$ is equal to 1 for $n = 1:N$ ➔

$$S_{Total}[k] = \sum_{i=1}^{M} A_i \cdot e^{j2\frac{L_i \cdot w_1}{v}} \cdot e^{j2\frac{\Delta\omega L_i}{v} \cdot k}$$

$$S_{Total}[n] = \mathcal{F}^{-1}[S_{Total}[k]]$$

$$S_{Total}[n] = \frac{1}{N} \cdot \sum_{k=1}^{N-1} \sum_{i=1}^{M} \left(A_i \cdot e^{j2\frac{L_i \cdot w_1}{v}} \cdot e^{j2\frac{\Delta\omega L_i}{v} \cdot k}\right) e^{j\frac{2\Pi kn}{N}}$$

We can replace between the summation for the variables that not dependent on i:

$$S_{Total}[n] = \frac{1}{N} \cdot \sum_{i=1}^{M} \left( A_i \cdot e^{j2\frac{L_i \cdot w_1}{v}} \sum_{k=1}^{N-1} e^{j2\frac{\Delta\omega L_i}{v} \cdot k} e^{j\frac{2\Pi kn}{N}} \right)$$

$$S_{Total}[n] = \frac{1}{N} \cdot \sum_{i=1}^{M} \left( A_i \cdot e^{j2\frac{L_i \cdot w_1}{v}} \delta\left(n \cdot \Delta t - \frac{2L_i}{v}\right) \right)$$

$$\Delta f = \frac{BW}{N} \rightarrow \Delta t = \frac{1}{BW}; \Delta t = \frac{2 \cdot \Delta L}{v}$$

$$\Delta L = \frac{v}{2 \cdot BW}$$

Object in distance $L_i$ will generate $\delta(\ )$ function in:

$$n_i = \frac{2L_i}{\Delta L} = \frac{2L_i \cdot BW}{v}$$

$$L_{max} = N \frac{v}{2 \cdot BW}$$

Figure 15:
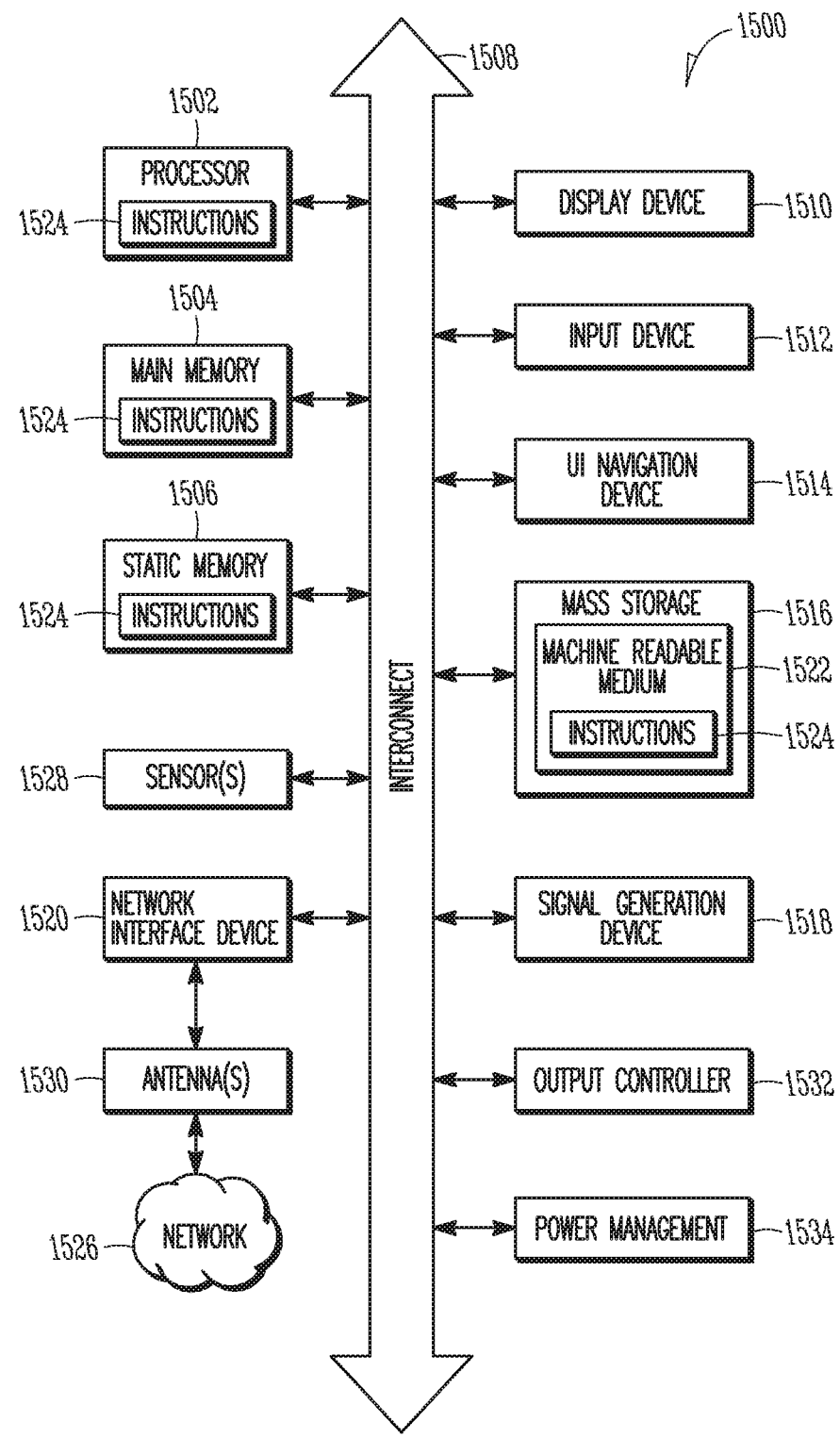
FIG. 15 is a block diagram of a computer system machine that is used to implement a device in some implementations of the various aspects of the present disclosure described herein.

FIG. 15 is a block diagram of a computer system machine 1500 that may be used to implement a device in some implementations of the various embodiments described herein. Computer system machine 1500 or elements of computer system machine 1500 may be used to implement any device, a mobile phone, tablet, laptop wireless access point, wireless station device or any other such device described herein. In various other embodiments, different device components or multiple of any element may be used in different devices. Some embodiments may include other elements, such as phased array antennas, RF components for communication and radar, or other such elements integrated with any of the elements described herein for machine 1500. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 1500 includes a processor 1502 (e.g., a central processing unit (CPU), a graphics processing unit (GPU) or both), a main memory 1504 and a static memory 1506, which communicate with each other via an interconnect 1508 (e.g., a link, a bus, etc.). The computer system machine 1500 can further include a video display unit 1512, an alphanumeric input device 1512 (e.g., a keyboard), and a user interface (UI) navigation device 1514 (e.g., a mouse). In one embodiment, the video display unit 1512, input device 1512 and UI navigation device 1514 are a touch screen display. The computer system machine 1500 can additionally include a storage device 1516 (e.g., a drive unit), a signal generation device 1518 (e.g., a speaker), an output controller 1532, a power management controller 1534, and a network interface device 1520 (which can include or operably communicate with one or more antennas 1530, transceivers, or other wireless communications hardware), and one or more sensors 1528, such as a Global Positioning Sensor (GPS) sensor, compass, location sensor, accelerometer, or other sensor. In some embodiments, for example, an input or sensor such as 1528 receives data or an input from a user that indicates that the user is using the device. In response, the device may shift into a mode which periodically performs a radar operation to determine if the device is close to the user's body. In such embodiments, when the device determines that it is not in use or not likely to be close to the user's body, either through a user input on a touchscreen or a sensor operation (e.g. determining that the device is stationary for more than a threshold time using a motion sensor.)

The portable storage element 1516 includes a machine-readable medium 1522 on which is stored one or more sets of data structures and instructions 1524 (e.g., software) embodying or utilized by any one or more of the methodologies or functions described herein. The instructions 1524 can also reside, completely or at least partially, within the main memory 1504, static memory 1506, and/or within the processor 1502 during execution thereof by the computer system machine 1500, with the main memory 1504, static memory 1506, and the processor 1502 also constituting machine-readable media.

While the machine-readable medium 1522 is illustrated in an aspect of the disclosure to be a single medium, the term "machine-readable medium" can include a single medium or multiple media (e.g., a centralized or distributed database, and/or associated caches and servers) that store the one or more instructions 1524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 1524 can further be transmitted or received over a communications network 1526 using a transmission medium via the network interface device 1520 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Figure 16:
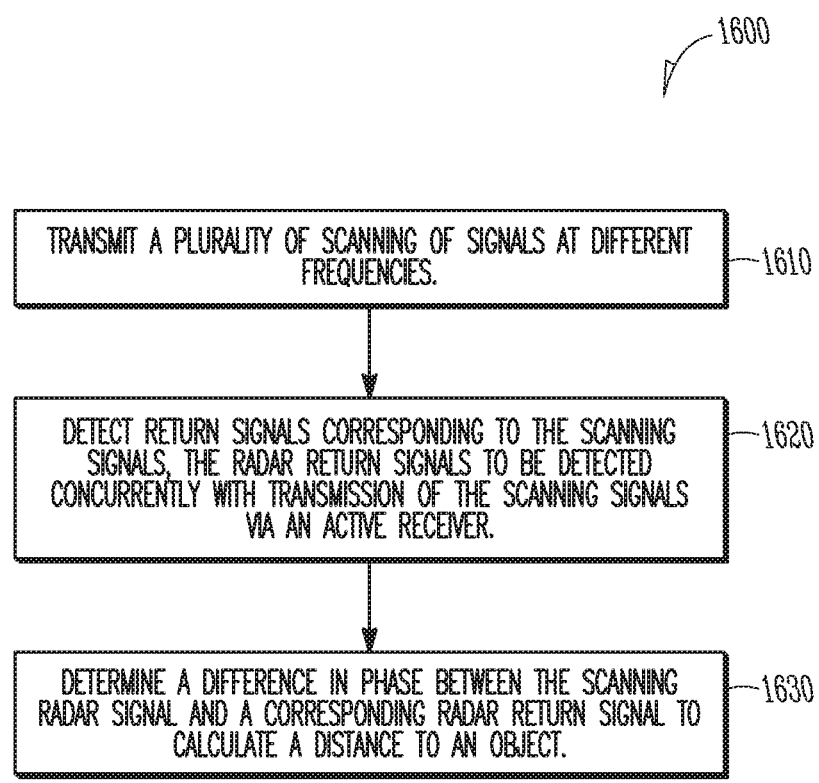
FIG. 16 illustrates a method in accordance with some aspects of the present disclosure.

FIG. 16 at 1600 illustrates a method for radar distance determination with phased array communications in a wireless device. The method at 1610 begins by transmitting a plurality of scanning signals at different frequencies. At 1620 the method detects return signals corresponding to the scanning signals, the radar return signals to be detected concurrently with transmission of the scanning signals via an active receiver. At 1630 a difference in phase is determined between the scanning radar signals and a corresponding radar return signal to calculate a distance to an object. The method may derive, from all phase differences between the scanning radar signals and corresponding radar return signals, vectors of measured phases versus a frequency domain with the vectors having a cycle time period in the frequency domain that is linearly proportional to the distance to the object. The method may of FIG. 16 may further generate all possible hypothesis of phases versus a frequency vector for each distance based on a required distance resolution and correlate a resulted Phase-Frequency vector to a suspected distance using an inverse Fast Fourier Transform (IFFT).

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 802.11, and Bluetooth communication standards. Various alternative embodiments may use a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 9.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate aspect of the present disclosure.

In Example 1, an apparatus of a wireless device configurable for wireless communications and radar operations, the apparatus comprising memory. The apparatus may further comprise processing circuitry coupled to the memory, wherein when configured for the radar operations, the processing circuitry is configured to generate a plurality of scanning signals at different frequencies, configure a transceiver to transmit the scanning signals, configure the transceiver to detect radar return signals corresponding to the scanning signals, the radar return signals to be detected concurrently with transmission of the scanning signals, and configure a radar module to receive the scanning signals and the corresponding radar return signals and determine phase and gain differences between the scanning signals and the corresponding radar return signals.

In Example 2 the subject matter of Example 1, wherein the return signals are the transmitted scanning signals reflected from an object and the phase and gain differences between the scanning signals and the corresponding radar return signals are correlated by the radar module to determine one or more of: distance of the object, velocity of the object, vibration of the object and dielectric constant of a material of the object.

In Example 3, the subject matter of one or any combination of Examples 1-2, wherein the transceiver to transmit the scanning signals for the radar operations is configurable for transmitting signals for communication when the apparatus is configured for wireless communication.

In Example 4, the subject matter of one or any combination of Examples 1-3, wherein the processing circuitry is configured to generate, if operating for communications, signals for phased array communications.

In Example 5, the subject matter of one or any combination of Examples 1-4, wherein the phased array communications are configured to communicate using wireless communication standards including one or more of: IEEE 802.11ad, IEEE 802.11ay, WiGig and 5G Mobile.

In Example 6, the subject matter of one or any combination of Examples 1-5, wherein radar module correlates the phase and gain differences between the scanning signals and the corresponding radar return signals to generate vectors of measured phase and gain versus a frequency domain and wherein the vectors have a cycle time period that is linearly proportional to the distance to the object.

In Example 7, the subject matter of one or any combination of Examples 1-6, wherein the scanning signal is a modulated 2-tones signal.

In Example 8, the subject matter of one or any combination of Examples 1-7, wherein the radar module is on a same radio frequency integrated circuit (RFIC) as the processing circuitry.

In Example 9, the subject matter of one or any combination of Examples 1-8, further comprising a modem, wherein the processing circuitry configures the modem to generate the scanning signals when configured for the radar operations and wherein the modem is configured to generate wireless communication signals when configured for wireless communication operation.

In Example 10, s non-transitory computer-readable storage medium that stores instructions for execution by one or more processors, the instructions to configure the one or more processors to cause a wireless device to operate for wireless communications and for radar operations, wherein when configured for the radar operations, the one or more processors further configure the wireless device to generate a plurality of scanning signals at different frequencies, configure a transceiver to transmit the scanning signals, configure the transceiver to detect radar return signals corresponding to the scanning signals, the radar return signals to be detected concurrently with transmission of the scanning signals, and configure a radar module to receive the scanning signals and the corresponding radar return signals and determine phase and gain differences between the scanning signals and the corresponding radar return signals.

In Example 11, the subject matter of Example 10, wherein the return signals are the transmitted scanning signals reflected from an object and the phase and gain differences between the scanning signals and the corresponding radar return signals are correlated by the radar module to determine one or more of: distance of the object, velocity of the object, vibration of the object and dielectric constant of a material of the object.

In Example 12, the subject matter of one or any combination of Examples 1-11, wherein the transceiver to transmit the scanning signals for the radar operations is configurable for transmitting signals for communication when the apparatus is configured for wireless communication.

In Example 13, the subject matter of one or any combination of Examples 1-12, wherein the instructions further configure the one or more processors to generate, if operating for communications, signals for phased array communications.

In Example 14, the subject matter of one or any combination of Examples 1-13, wherein the phased array communications are configured to communicate using wireless communication standards including one or more of: IEEE 802.11ad, IEEE 802.11ay, WiGig and 5G Mobile.

In Example 15, the subject matter of one or any combination of Examples 1-14, wherein radar module uses the phase and gain differences between the scanning signals and the corresponding radar return signals to generate vectors of measured phase and gain versus a frequency domain and wherein the vectors have a cycle time period that is linearly proportional to the distance to the object.

In Example 16, the subject matter of one or any combination of Examples 1-15, wherein the scanning signal is a modulated 2-tones signal.

In Example 17, the subject matter of one or any combination of Examples 1-16, wherein the radar module is on a same radio frequency integrated circuit (RFIC) as the processing circuitry.

In Example 18, the subject matter of one or any combination of Examples 1-17, wherein the instructions further configure the one or more processors to configure a modem to generate the scanning signals when configured for the radar operations and wherein the modem is configured to generate wireless communication signals when configured for wireless communication operation.

In Example 19 a method for radar operations in a wireless device configurable for wireless communications and the radar operations, comprising, generating a plurality of scanning signals at different frequencies, configuring a transceiver to transmit the scanning signals, configuring the transceiver to detect radar return signals corresponding to the scanning signals, the radar return signals to be detected concurrently with transmission of the scanning signals, configuring a radar module to receive the scanning signals and the corresponding radar return signals and determining phase and gain differences between the scanning signals and the corresponding radar return signals.

In Example 20, the subject matter of Example 19, wherein the return signals are the transmitted scanning signals reflected from an object and the phase and gain differences between the scanning signals and the corresponding radar return signals are correlated by the radar module to determine one or more of: distance of the object, velocity of the object, vibration of the object and dielectric constant of a material of the object.

In Example 21, the subject matter of one or any combination of Examples 1-20, wherein the transceiver to transmit the scanning signals for the radar operations is configurable for transmitting signals for communication when the apparatus is configured for wireless communication.

In Example 22, the subject matter of one or any combination of Examples 1-21, wherein the processing circuitry is configured to generate, if operating for communications, signals for phased array communications.

In Example 23, the subject matter of one or any combination of Examples 1-22, wherein the phased array communications are configured to communicate using wireless communication standards including one or more of: IEEE 802.11ad, IEEE 802.11ay, WiGig and 5G Mobile.

In Example 24, the subject matter of one or any combination of Examples 1-23, further comprising correlating the phase and gain differences between the scanning signals and the corresponding radar return signals to generate vectors of measured phase and gain versus a frequency domain and wherein the vectors have a cycle time period that is linearly proportional to the distance to the object.

In Example 25, a wireless module of a wireless device, comprising, wireless communication circuits for operating the wireless device for wireless communications, a radar circuit operable with the wireless communication circuits to configure the wireless device for radar operations, wherein the wireless communication circuits comprise baseband processing circuitry and wherein the radar circuit instructs the baseband processing circuitry to generate a plurality of scanning signals at different frequencies, wherein the communication circuits further comprise a front end circuit, and wherein the radar circuit instructs the front end circuit to transmit the plurality of scanning signals at different frequencies, wherein the radar circuit further instructs the front end circuit to detect radar return signals corresponding to the scanning signals, the radar return signals to be detected concurrently with transmission of the scanning signals and wherein the radar circuit is to receive the scanning signals and the corresponding radar return signals and determine phase and amplitude differences versus time between the scanning signals and the corresponding radar return signals.

In Example 26, the subject matter of claim 25, wherein the return signals are the transmitted scanning signals reflected from an object and the phase and amplitude differences versus time between the scanning signals and the corresponding radar return signals are measured by the radar circuit to determine one or more of: distance of the object, velocity of the object, vibration of the object and dielectric constant of a material of the object.

In Example 27, the subject matter of any of claims 25-26, wherein the wireless module is further configured to communicate using wireless communication standards including one or more of: IEEE 802.11ad, IEEE 802.11ay, WiGig and 5G Mobile.

In Example 28, the subject matter of any of claims 25-27, wherein the radar circuit is operable to measure the phase and amplitude difference versus time between the scanning signals and the corresponding radar return signals using a six port detector.

In Example 29, the subject matter of any of claims 25-28, wherein the radar circuit is operable to measure the phase and amplitude difference versus time between the scanning signals and the corresponding radar return signals by sampling and digitally processing the phase and amplitude difference versus time between the scanning signals and the corresponding radar return signals.

In Example 30, the subject matter of any of claims 25-29, wherein the radar circuit is operable to measure the phase and amplitude difference versus time between the scanning signals and the corresponding radar return signals by mixing the scanning signals and the corresponding radar return signals with a mixer or by using a downconverter to downconvert different chains of the scanning signals and the corresponding radar return signals.

What is claimed is:

1. An apparatus of a wireless device configurable for wireless communications operations and for radar operations, the apparatus comprising a memory; and processing circuitry operatively coupled to the memory, the processing circuitry is configured to:
configure a transceiver to transmit chirps of continuous wave scanning signals at different frequencies, each scanning signal transmitted at one of the frequencies being transmitted for a predetermined time period;
configure the transceiver to detect radar return signals from an object corresponding to the scanning signals, each radar return signal corresponding to an associated scanning signal, the predetermined time period having a duration sufficient for the transceiver to detect one of the radar return signals concurrently with transmission of the associated scanning signal; and
configure a radar component to receive the scanning signals and the corresponding radar return signals and determine phase and gain differences between the scanning signals and the corresponding radar return signals,
wherein the phase difference for each of the different frequencies is determined before moving to another of the frequencies and transmitting one of the scanning signals on the other of the frequencies, and
wherein the radar component is further configured to eliminate a phase ambiguity between each radar return signal and the associated scanning signal using a combination of the individual phase differences between the radar return signals and the associated scanning signals to obtain a particular phase-frequency vector during determination of a distance to the object by:
generation of possible hypotheses of phase-frequency vectors for each of a plurality of distances, and
correlation of the particular phase-frequency vector to the possible hypotheses of phase-frequency vectors to determine the distance to the object from among the plurality of distances.

2. The apparatus of claim 1, wherein the corresponding radar return signals are the transmitted scanning signals reflected from the object and the phase and gain differences between the scanning signals and the corresponding radar return signals are measured by the radar component to determine one or more of: velocity of the object, vibration of the object and dielectric constant of a material of the object.

3. The apparatus of claim 1, wherein the transceiver to transmit the scanning signals for the radar operations is configurable for transmitting signals for communication instead of transmitting signals for radar operations when the apparatus is configured for the wireless communication operations.

4. The apparatus of claim 3, further comprising a phased array configured to communicate using wireless communication standards including one or more of: IEEE 802.11ad, IEEE 802.11ay, WiGig and 5G Mobile when the apparatus is configured for the wireless communications operations and for the radar operations.

5. The apparatus of claim 1, wherein the processing circuitry is further configured to correlate the phase and gain differences between the scanning signals and the corresponding radar return signals to generate vectors of measured phase and gain versus a frequency domain and wherein the vectors have a cycle time period that is linearly proportional to a distance between the apparatus and the object on which the transmitted scanning signals impinge to generate the corresponding radar return signals by reflection of the transmitted scanning signals using an inverse fast Fourier transform.

6. The apparatus of claim 1, wherein the radar component is on a same radio frequency integrated circuit (RFIC) as the processing circuitry.

7. The apparatus of claim 1, further comprising a modem, wherein the processing circuitry configures the modem to generate the scanning signals when configured for the radar operations and wherein the modem is configured to generate wireless communication signals when configured for the wireless communication operations.

8. A non-transitory computer-readable storage medium storing instructions for execution by one or more processors that when executed cause a wireless device to:
operate for wireless communications and for radar operations, wherein when configured for the radar operations, the one or more processors further configure the wireless device to:
configure a transceiver to transmit chirps of continuous wave scanning signals at different frequencies, each scanning signal transmitted at one of the frequencies being transmitted for a predetermined time period;
configure the transceiver to detect radar return signals corresponding to the scanning signals, each radar return signal corresponding to an associated scanning signal, the predetermined time period having a duration sufficient for the transceiver to detect one of the radar return signals concurrently with transmission of the associated scanning signal; and
configure a radar module to receive the scanning signals and the corresponding radar return signals and determine phase and gain differences between the scanning signals and the corresponding radar return signals,
wherein the phase difference for each of the different frequencies determined before moving to another of the frequencies and transmitting one of the scanning signals on the other of the frequencies,
wherein the radar module is further configured to eliminate a phase ambiguity between each radar return signal and the associated scanning signal using a combination of the individual phase differences between the radar return signals and the associated scanning signals to obtain a particular phase-frequency vector during determination of a distance to the object by:
generation of possible hypotheses of phase-frequency vectors for each of a plurality of distances, and
correlation of the particular phase-frequency vector to the possible hypotheses of phase-frequency vectors to determine the distance to the object from among the plurality of distances.

9. The non-transitory computer-readable storage medium according to claim 8, wherein the corresponding radar return signals are the transmitted scanning signals reflected from the object and the phase and gain differences between the scanning signals and the corresponding radar return signals are measured by the radar module to determine one or more of: velocity of the object, vibration of the object and dielectric constant of a material of the object.

10. The non-transitory computer-readable storage medium according to claim 8, wherein the transceiver is configurable for transmitting signals for communication when the apparatus is configured for the wireless communication operations.

11. The non-transitory computer-readable storage medium according to claim 8, wherein the communications use a phased array to communicate using wireless communication standards including one or more of: IEEE 802.11ad, IEEE 802.11ay, WiGig and 5G Mobile.

12. The non-transitory computer-readable storage medium according to claim 8, wherein the instructions when executed further cause the wireless device to correlate the phase and gain differences between the scanning signals and the corresponding radar return signals to generate vectors of measured phase and gain versus a frequency domain and wherein the vectors have a cycle time period that is linearly proportional to a distance between the apparatus and the object on which the transmitted scanning signals impinge to generate the corresponding radar return signals by reflection of the transmitted scanning signals using an inverse fast Fourier transform.

13. The non-transitory computer-readable storage medium according to claim 8, wherein the radar module is on a same radio frequency integrated circuit (RFIC) as the one or more processors.

14. The non-transitory computer-readable storage medium according to claim 8, wherein the instructions further configure the one or more processors to configure a modem to generate the scanning signals when configured for the radar operations and wherein the modem is configured to generate wireless communication signals when configured for the wireless communication operation.

15. A method for radar operations in a wireless device configurable for wireless communications and the radar operations, comprising:
configuring a transceiver to transmit chirps of continuous wave scanning signals at different frequencies, each scanning signal transmitted at one of the frequencies being transmitted for a predetermined time period;
configuring the transceiver to detect radar return signals from an object corresponding to the scanning signals, each radar return signal corresponding to an associated scanning signal, the predetermined time period having a duration sufficient for the transceiver to detect one of the radar return signals concurrently with transmission of the associated scanning signal;
configuring a radar module to receive the scanning signals and the corresponding radar return signals; and
determining phase and gain differences between the scanning signals and the corresponding radar return signals, the phase difference for each of the different frequencies determined before moving to another of the frequencies and transmitting one of the scanning signals on the other of the frequencies, wherein said determining includes eliminating a phase ambiguity between each radar return signal and the associated scanning signal using a combination of the individual phase differences between the radar return signals and the associated scanning signals to obtain a particular phase-frequency vector during determination of a distance to the object by:
generation of possible hypotheses of phase-frequency vectors for each of a plurality of distances, and
correlation of the particular phase-frequency vector to the possible hypotheses of phase-frequency vectors to determine the distance to the object from among the plurality of distances.

16. The method of claim 15, wherein the corresponding radar return signals are the transmitted scanning signals reflected from the object and the phase and gain differences between the scanning signals and the corresponding radar return signals are measured to determine one or more of: velocity of the object, vibration of the object and dielectric constant of a material of the object.

17. The method of claim 15, the method further comrpising configuring the transceiver for transmitting signals for communication in the wireless communication operations.

18. The method of claim 15, further comprising using a phased array for the wireless communication operations.

19. The apparatus of claim 18, wherein the communications that use a phased array are configured to communicate using wireless communication standards including one or more of: IEEE 802.11ad, IEEE 802.11ay, WiGig and 5G Mobile.

20. The method of claim 15, further comprising correlating the phase and gain differences between the scanning signals and the corresponding radar return signals to generate vectors of measured phase and gain versus a frequency domain and wherein the vectors have a cycle time period that is linearly proportional to a distance between the wireless device and the object on which the transmitted scanning signals impinge to generate the corresponding radar return signals by reflection of the transmitted scanning signals using an inverse fast Fourier transform.

21. A wireless module of a wireless device, comprising:
wireless communication circuits for operating the wireless device for wireless communications;
a radar circuit operable with the wireless communication circuits to configure the wireless device for radar operations;
wherein the communication circuits further comprise a front end circuit, and wherein the radar circuit instructs the front end circuit to transmit chirps of a plurality of continuous wave scanning signals at different frequencies, each scanning signal transmitted at one of the frequencies being transmitted for a predetermined time period;
wherein the radar circuit further instructs the front end circuit to detect radar return signals from an object corresponding to the scanning signals, each radar return signal corresponding to an associated scanning signal, the predetermined time period having a duration sufficient for the transceiver to detect one of the radar return signals concurrently with transmission of the associated scanning signal; and
wherein the radar circuit is to receive the scanning signals and the corresponding radar return signals and determine phase and amplitude differences versus time between the scanning signals and the corresponding radar return signals, wherein the phase difference for each of the different frequencies is determined before moving to another of the frequencies and transmitting one of the scanning signals on the other of the frequencies, wherein the radar circuit is further to eliminate a phase ambiguity between each radar return signal and the associated scanning signal using a combination of the individual phase differences between the radar return signals and the associated scanning signals to obtain a particular phase-frequency vector during determination of a distance to the object by:
 generation of possible hypotheses of phase-frequency vectors for each of a plurality of distances, and
 correlation of the particular phase-frequency vector to the possible hypotheses of phase-frequency vectors to determine the distance to the object from among the plurality of distances.

22. The wireless module of claim 21, wherein the corresponding radar return signals are the transmitted scanning signals reflected from the object and the phase and amplitude differences versus time between the scanning signals and the corresponding radar return signals are measured by the radar circuit to determine one or more of: velocity of the object, vibration of the object and dielectric constant of a material of the object.

23. The wireless module of claim 21, wherein the wireless module is further configured to communicate using wireless communication standards including one or more of: IEEE 802.11ad, IEEE 802.11ay, WiGig and 5G Mobile.

24. The wireless module of claim 21, wherein the radar circuit is operable to measure the phase and amplitude difference versus time between the scanning signals and the corresponding radar return signals using a six port detector.

25. The wireless module of claim 21, wherein the radar circuit is operable to measure the phase and amplitude difference versus time between the scanning signals and the corresponding radar return signals by sampling and digitally processing the phase and amplitude difference versus time between the scanning signals and the corresponding radar return signals.

26. The apparatus of claim 1, wherein the radar component comprises:
 a passive interferometric six port device to which a first scanning signal of the one or more scanning signals and a first corresponding radar return signal of the corresponding radar return signals are supplied, the interferometric six port device configured to add the first scanning signal and the first corresponding radar return signal at relative phase offsets of 0, 90, 180 and 270 degrees and provide an output for each relative phase offset,
 a plurality of power detectors to detect power of each of the outputs from the passive interferometric six port device,
 a plurality of analog-to-digital (ADC) converters to which outputs from the power detectors are supplied, and
 a digital signal processor to process outputs of the ADC converters to determine the phase difference between the first scanning signals and the first corresponding radar return signal.

27. The apparatus of claim 26, wherein the apparatus further comprises:
 a single antenna module configured to transmit the one or more scanning signals and the corresponding radar return signals, and
 a directional coupler to isolate the one or more scanning signals transmitted concurrently with the corresponding radar return signals.

28. The apparatus of claim 1, wherein:
 the transceiver is configured to detect the radar return signals without use of a switch configured to switch between transmission and reception by the apparatus.

\* \* \* \* \*